US010432055B2

United States Patent
Higuchi et al.

(10) Patent No.: US 10,432,055 B2
(45) Date of Patent: Oct. 1, 2019

(54) MOTOR, ACTUATOR, SEMICONDUCTOR MANUFACTURING APPARATUS, AND FLAT DISPLAY MANUFACTURING APPARATUS

(71) Applicant: NSK LTD., Tokyo (JP)

(72) Inventors: Hideya Higuchi, Kanagawa (JP); Tsuyoshi Nakamura, Kanagawa (JP); Hayao Watanabe, Kanagawa (JP)

(73) Assignee: NSK LTD., Tokyo (JP)

( * ) Notice: Subject to any disclaimer, the term of this patent is extended or adjusted under 35 U.S.C. 154(b) by 302 days.

(21) Appl. No.: 15/536,418

(22) PCT Filed: Dec. 24, 2015

(86) PCT No.: PCT/JP2015/086077
§ 371 (c)(1),
(2) Date: Jun. 15, 2017

(87) PCT Pub. No.: WO2016/129190
PCT Pub. Date: Aug. 18, 2016

(65) Prior Publication Data
US 2017/0331343 A1    Nov. 16, 2017

(30) Foreign Application Priority Data
Feb. 9, 2015   (JP) .................................. 2015-023323

(51) Int. Cl.
*H02K 9/00*     (2006.01)
*H02K 5/10*     (2006.01)
(Continued)

(52) U.S. Cl.
CPC ............. *H02K 5/10* (2013.01); *F16C 35/067* (2013.01); *F16C 35/07* (2013.01); *H02K 5/04* (2013.01);
(Continued)

(58) Field of Classification Search
CPC ....................................................... H02K 5/20
(Continued)

(56) References Cited

U.S. PATENT DOCUMENTS 5,128,571 A     7/1992  Itsu
6,175,171 B1 *  1/2001  Rupp .................. H02K 5/18
                                                165/80.3

(Continued)

FOREIGN PATENT DOCUMENTS

JP      56-44362 A    4/1981
JP      4-39053 U1    4/1992
(Continued)

OTHER PUBLICATIONS

Communication dated Jun. 20, 2017, from the Japanese Patent Office in counterpart Japanese application No. 2015-023323.
(Continued)

*Primary Examiner* — Alexander Talpalatski
(74) *Attorney, Agent, or Firm* — Sughrue Mion, PLLC

(57) ABSTRACT

Provided is a motor capable of more reliably preventing dust generated therein from flowing to the outside. A motor includes a stator, a rotor, a rotor housing which rotates along with the rotor, a stator housing which fixes the stator thereto, includes spaces formed with respect to the rotor housing, and overlaps the rotor housing with first gaps interposed therebetween in the entire circumferential direction, annular members which overlap the stator housing with second gaps interposed therebetween in the entire circumferential direction inside the spaces, exhaust holes which suck and discharge air inside the spaces through the second gaps, and exhaust grooves.

25 Claims, 14 Drawing Sheets

(51) Int. Cl.
*F16C 35/067* (2006.01)
*F16C 35/07* (2006.01)
*H02K 5/173* (2006.01)
*H02K 9/24* (2006.01)
*H02K 7/08* (2006.01)
*H02K 5/04* (2006.01)
*H02K 5/20* (2006.01)
*H02K 21/22* (2006.01)

(52) U.S. Cl.
CPC ......... *H02K 5/1732* (2013.01); *H02K 5/1737* (2013.01); *H02K 7/086* (2013.01); *H02K 7/088* (2013.01); *H02K 9/24* (2013.01); *H02K 5/20* (2013.01); *H02K 21/22* (2013.01); *H02K 2205/09* (2013.01); *H02K 2213/03* (2013.01)

(58) Field of Classification Search
USPC ..................................................... 310/88, 52
See application file for complete search history.

(56) References Cited

U.S. PATENT DOCUMENTS

| 6,333,576 | B1 | 12/2001 | Ishikawa et al. | |
|---|---|---|---|---|
| 7,042,121 | B2* | 5/2006 | De Filippis | F04D 25/082 |
| | | | | 310/52 |
| 7,977,831 | B2* | 7/2011 | De Filippis | F04D 25/082 |
| | | | | 310/58 |
| 8,242,644 | B2* | 8/2012 | Booth | H02K 9/08 |
| | | | | 310/52 |
| 8,749,102 | B2* | 6/2014 | Kozaka | H02K 1/32 |
| | | | | 310/52 |
| 8,786,982 | B1 | 6/2014 | Kodama et al. | |
| 2008/0001487 | A1* | 1/2008 | Wei | H02K 1/20 |
| | | | | 310/54 |

FOREIGN PATENT DOCUMENTS

| JP | 9-29682 A | 2/1997 |
|---|---|---|
| JP | 2006-187072 A | 7/2006 |
| JP | 2007-166694 A | 6/2007 |
| JP | 2012-213259 A | 11/2012 |
| JP | 2016119780 A | 6/2016 |

OTHER PUBLICATIONS

International Search Report of PCT/JP2015/086077, dated Mar. 15, 2016. [PCT/ISA/210].
Communication dated Aug. 9, 2018, from the European Patent Office in counterpart European Application No. 15882063.9.

* cited by examiner

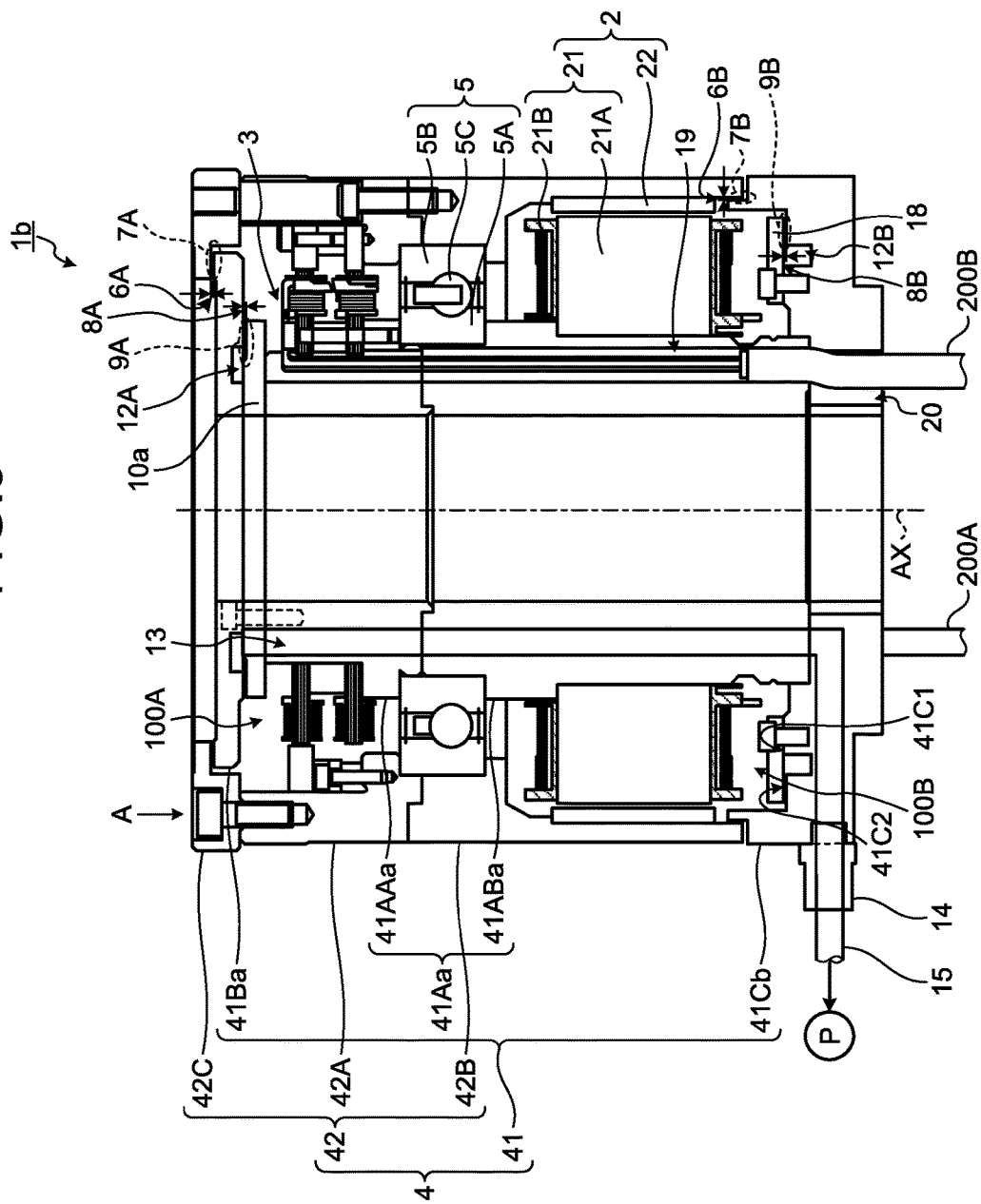

MOTOR, ACTUATOR, SEMICONDUCTOR MANUFACTURING APPARATUS, AND FLAT DISPLAY MANUFACTURING APPARATUS

CROSS REFERENCE TO RELATED APPLICATIONS

This application is a National Stage of International Application No. PCT/JP2015/086077 filed Dec. 24, 2015, claiming priority based on Japanese Patent Application No. 2015-023323, filed Feb. 9, 2015, the contents of all of which are incorporated herein by reference in their entirety.

FIELD

The present invention relates to a motor, an actuator, a semiconductor manufacturing apparatus, and a flat display manufacturing apparatus.

BACKGROUND

A motor which is used in a semiconductor manufacturing apparatus or a flat panel display manufacturing apparatus or an actuator using the motor is required to have high reliability. Further, in the manufacturing of a semiconductor or a flat panel display, a manufacturing process needs to be performed under a clean environment in order to prevent dust from being mixed with a manufactured object. In order to ensure high reliability, a motor or an actuator which is used under a clean environment needs to be devised so that dust generated inside the motor or the actuator does not flow to the outside.

For example, Patent Literature 1 discloses a sealing device which sucks air from an air chamber between two flange portions to suck air from a gap between the flange portion and an operation shaft so that dust generated from an unclean environment cannot intrude into a clean environment.

CITATION LIST

Patent Literature

Patent Literature 1: JP 09-29682 A

SUMMARY

Technical Problem

Since the sealing device disclosed in Patent Literature 1 sucks air from both a gap between the clean environment side flange portion and the operation shaft and a gap between the unclean environment side flange portion and the operation shaft, it is considered that a pressure distribution is formed at the air chamber. Further, when there is a difference in pressure between the clean environment side and the unclean environment side, there is a possibility that the clean environment side may be contaminated since air leaks from the unclean environment side toward the clean environment side.

The invention has been made in view of the above-described circumstances and an object of the invention is to provide a motor capable of more reliably preventing dust generated therein from flowing to the outside.

Solution to Problem

To solve the above-described problem and achieve the object, a motor includes a stator which includes a coil and a stator core, a rotor which is disposed at the outside of the stator in the radial direction and rotates relative to the stator, a rotor housing which rotates along with the rotor, a stator housing which fixes the stator thereto, includes a space formed between the stator housing and the rotor housing, and overlaps the rotor housing with a first gap interposed therebetween in the entire circumferential direction, a bearing which supports the rotor housing to be rotatable relative to the stator housing, an annular member which overlaps the stator housing with a second gap interposed therebetween in the entire circumferential direction inside the space, an exhaust hole which sucks and discharges air of the space through the second gap, and an exhaust groove which is interposed between the second gap and the exhaust hole and is provided at the stator housing in the entire circumferential direction along the second gap.

By the above-described configuration, when the suction exhaust device is connected to the exhaust hole formed at the stator housing and the suction exhaust device is operated, air inside motor is uniformly sucked from the aperture portion. Accordingly, it is possible to reliably prevent dust generated inside the motor from flowing to the outside.

Further, as a desirable embodiment, it is preferable that the stator housing includes a first stator housing which includes at least two members sandwiching an inner race of the bearing in an axial direction having an axis corresponding to a rotation center of the rotor, a second stator housing which is provided at one end side of the first stator housing in the axial direction and in which a first exhaust groove is provided between the first stator housing and the second stator housing, a first annular member is fixed therebetween, and the first gap is provided with respect to the first annular member, and a third stator housing which is provided at the other end side of the first stator housing in the axial direction and in which a second exhaust groove is provided between the first stator housing and the third stator housing, a second annular member is fixed therebetween, and the first gap is provided with respect to the second annular member. It is preferable that the rotor housing includes at least two members that sandwich an outer race of the bearing in the axial direction, the first gap is provided between the second stator housing and the rotor housing and a first space is provided along with the first stator housing, the second stator housing, and the bearing, and the first gap is provided between the third stator housing and the rotor housing and a second space is provided along with the second stator housing, the third stator housing, and the bearing.

By the above-described configuration, when the suction exhaust device is connected to the first exhaust hole and the suction exhaust device is operated, air of the first space inside the motor surrounded by the first stator housing, the second stator housing, the rotor housing, and the bearing is uniformly sucked out from the first exhaust hole and air is uniformly sucked into the first space from the first seal portion. Accordingly, it is possible to reliably prevent dust generated in the first space from flowing to the outside. Further, when the suction exhaust device is connected to the second exhaust hole and the suction exhaust device is operated, air of the second space inside the motor surrounded by the first stator housing, the third stator housing, the rotor housing, and the bearing is uniformly sucked out from the second exhaust hole and air is uniformly sucked into the second space from the second seal portion. Accordingly, it is possible to reliably prevent dust generated in the second space from flowing to the outside. Further, the number of the management items for managing the accuracy of the second gap forming the first aperture portion and the second gap forming the second aperture portion is reduced. As a result, it is possible to improve the yield when manufacturing the motor.

Further, a surface facing the second stator housing in the first annular member may be provided with a step forming the second gap with respect to the second stator housing.

Further, a surface facing the first annular member in the second stator housing may be provided with a step forming the second gap with respect to the second stator housing.

Further, the motor may further include a spacer member that is interposed between the first annular member and the second stator housing to form the second gap between the first annular member and the second stator housing.

Further, a surface facing the third stator housing in the second annular member may be provided with a step forming the second gap with respect to the third stator housing.

Further, a surface facing the second annular member in the third stator housing may be provided with a step forming the second gap with respect to the second annular member.

Further, the motor may further include a spacer member that is interposed between the second annular member and the third stator housing to form the second gap between the second annular member and the third stator housing.

Further, as a preferable embodiment, it is preferable that a groove portion is provided at a fitting surface formed by overlapping the second stator housing and the first stator housing in the radial direction and an O-ring is provided at the groove portion.

By the above-described configuration, the airtightness of the fitting surface in which the first stator housing and the second stator housing overlap each other in the radial direction is maintained. Further, the processing accuracy of the fitting surface between the first stator housing and the second stator housing can be set roughly and thus the allowable range can be widened. As a result, the yield is improved.

Further, a first exhaust hole may be provided at the second stator housing and a second exhaust hole is provided at the third stator housing.

Further, as a desirable embodiment, it is preferable that the first exhaust hole is provided so that the second stator housing, the first stator housing, and the third stator housing communicate with each other, and the second exhaust hole is provided at the third stator housing.

By the above-described configuration, the hollow diameter opened to the upper end of the second stator housing in the axial direction can be increased.

Further, the first exhaust hole may be formed so that an opening portion is provided at the other end of the second stator housing in the axial direction, and the second exhaust hole may be formed so that an opening portion is provided at a circumferential surface of the third stator housing.

Further, as a desirable embodiment, it is preferable that the exhaust hole is formed so that the second stator housing, the first stator housing, and the third stator housing communicate with one another and the first exhaust groove and the second exhaust groove are connected to each other.

By the above-described configuration, when one suction exhaust device is connected to the exhaust hole and the suction exhaust device is operated, air of the first space and the second space is uniformly sucked out from the exhaust hole and air is uniformly sucked into the first space and the second space from the first seal portion and the second seal portion. Accordingly, it is possible to reliably prevent dust generated in the first space and the second space from flowing to the outside.

Further, the exhaust hole may be formed so that an opening portion is provided at an outer circumferential surface of the third stator housing in the radial direction.

Further, the exhaust hole may be formed so that an opening portion is provided at the other end of the third stator housing in the axial direction.

Further, as a desirable embodiment, it is preferable that the exhaust hole is formed so that an opening portion is provided at an outer circumferential surface of the third stator housing in the radial direction and the other end of the third stator housing in the axial direction, and any one of opening portions is sealed.

By the above-described configuration, since the opening portion of the exhaust hole connected to the suction exhaust device can be selected from the opening portion provided at the lower end of the third stator housing in the axial direction and the opening portion provided at the outer circumferential surface in the radial direction of the third stator housing, the motor can be more versatile.

Further, the second stator housing may be fixed to the first stator housing through the first annular member.

Further, the first annular member may be integrated with the first stator housing.

Further, the third stator housing may be fixed to the first stator housing through the second annular member.

Further, the second annular member may be integrated with the first stator housing.

Further, as a desirable embodiment, it is preferable that the first stator housing is provided with a first cable insertion hole formed in the axial direction so that a motor driving or detecting cable is inserted therethrough, the third stator housing is provided with a second cable insertion hole formed in the axial direction so as to communicate with the first cable insertion hole and to insert a cable therethrough, and a radial center position of the first cable insertion hole and a radial center position of the second cable insertion hole are different from each other so that an opening area formed by overlapping the first cable insertion hole and the second cable insertion hole in the axial direction is substantially the same as a cross-sectional area of the cable.

By the above-described configuration, the airtightness of the opening portion in which the first cable insertion hole and the second cable insertion hole overlap each other in the axial direction is maintained.

Further, it is preferable that the bearing is a roller bearing or a sliding bearing.

By the above-described configuration, an external power source for driving the bearing is not necessary.

To solve the above-described problem and achieve the object, an actuator includes the above-described motor, and a driven object which is driven by the motor.

Accordingly, it is possible to obtain an actuator suitably used under a clean environment.

To solve the above-described problem and achieve the object, a semiconductor manufacturing apparatus includes the above-described motor or the above-described actuator. Accordingly, it is possible to obtain a semiconductor manufacturing apparatus suitably used under a clean environment.

To solve the above-described problem and achieve the object, a flat display manufacturing apparatus includes the above-described motor or the above-described actuator. Accordingly, it is possible to obtain a flat display manufacturing apparatus suitably used under a clean environment.

Advantageous Effects of Invention

According to the invention, it is possible to provide a motor capable of more reliably preventing dust generated therein from flowing to the outside.

BRIEF DESCRIPTION OF DRAWINGS

FIG. 9 is a cross-sectional view illustrating an example of a motor according to a third embodiment.

DESCRIPTION OF EMBODIMENTS

A mode for carrying out the invention (embodiments) will be described in detail with reference to the drawings. The invention is not limited to the content described in the following embodiments. Further, components to be described below include a component which is easily conceived by those skilled in the art and the substantially same component. Furthermore, the components to be described below can be appropriately combined with one another.

First Embodiment

Figure 1:
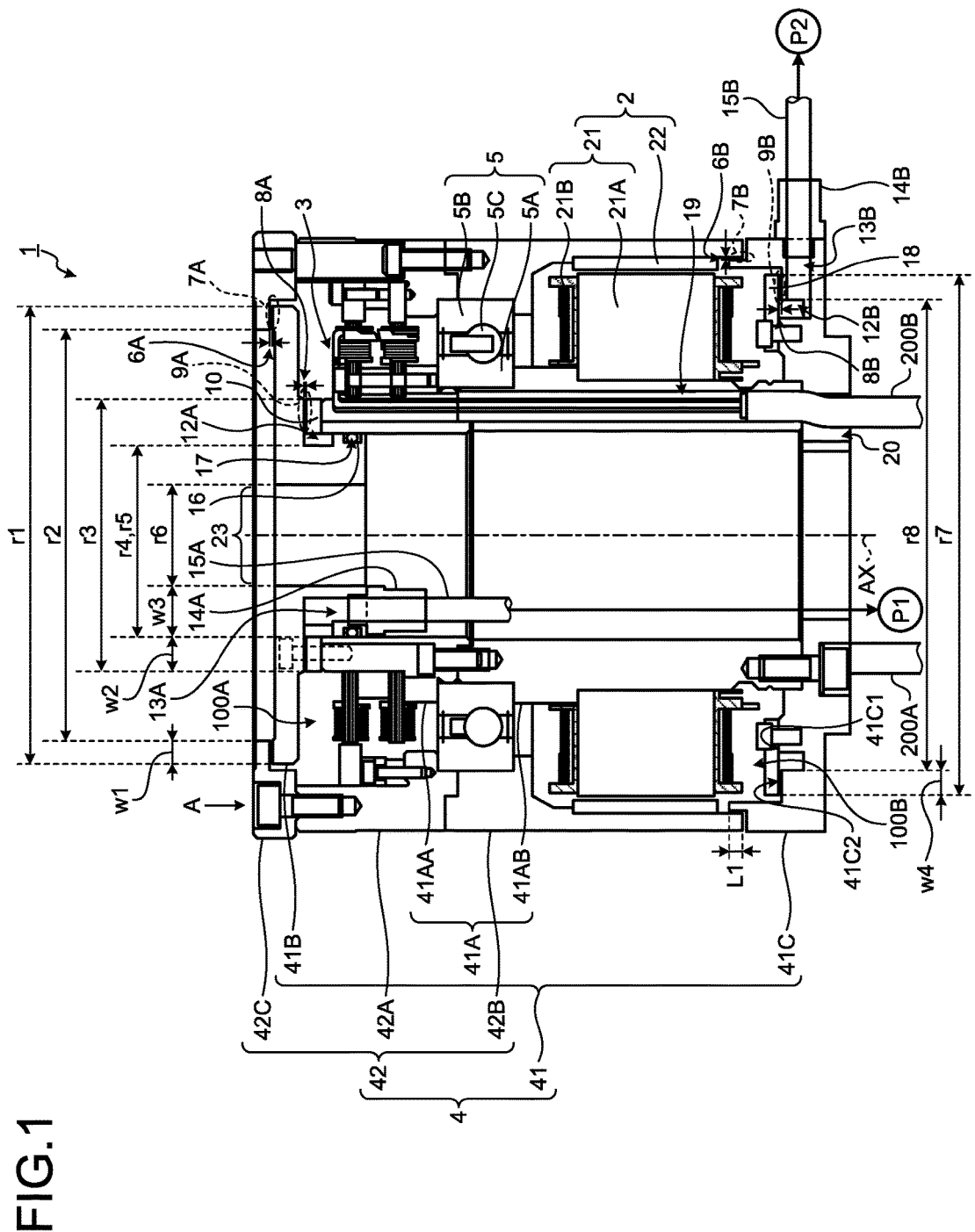
FIG. 1 is a cross-sectional view illustrating an example of a motor according to a first embodiment.

FIG. 1 is a cross-sectional view illustrating an example of a motor according to a first embodiment. In the example illustrated in FIG. 1, a motor 1 is a direct drive motor which directly transmits generated power to a target without using a speed reduction mechanism. As illustrated in FIG. 1, the motor 1 includes a motor part 2 which generates power for rotating a target, a rotation detector 3 which detects a rotation of the motor part 2, a housing 4 which holds the motor part 2 and the rotation detector 3, a cable 200A which is connected to the motor part 2, and a cable 200B which is connected to the rotation detector 3. The cables 200A and 200B are connected to a control device (not illustrated) for controlling the motor 1.

The motor part 2 includes a stator 21 and a rotor 22 which can rotate relative to the stator 21. The rotor 22 rotates about a rotation axis AX.

In the embodiment, the motor 1 is of an outer rotor type. The rotor 22 is disposed around the stator 21. The rotor 22 is disposed at the outside of the stator 21 with respect to the rotation axis AX.

The stator 21 includes a stator core 21A and a coil 21B which is supported by the stator core 21A. The stator core 21A includes a plurality of teeth which are arranged at the same interval about the rotation axis AX. The coil 21B is provided at a plurality of positions. The coils 21B are respectively supported by the plurality of teeth of the stator core 21A.

The rotor 22 includes a plurality of permanent magnets which are arranged at the same interval about the rotation axis AX. The stator 21 and the rotor 22 face each other with a gap interposed therebetween.

The rotation detector 3 detects a rotation of the motor part 2. The rotation detector 3 includes a resolver and detects at least one of a rotation speed, a rotation direction, and a rotation angle of the rotor 22 of the motor part 2. In the embodiment, the rotation detector 3 includes two types of resolvers, that is, an absolute resolver and an incremental resolver.

The housing 4 includes a stator housing 41 and a rotor housing 42 which is disposed at the outside of the stator housing 41 with respect to the rotation axis AX. The stator housing 41 is an annular member. The rotor housing 42 is an annular member. In the embodiment, the stator housing 41 and the rotor housing 42 are respectively cylindrical members. A center axis of the stator housing 41, a center axis of the rotor housing 42, and the rotation axis AX match one another. Hereinafter, a direction parallel to the rotation axis AX will be referred to as an "axial direction".

In the embodiment, the stator housing 41 includes a first stator housing 41A, a second stator housing 41B, and a third stator housing 41C which are formed in a cylindrical shape and are arranged in the axial direction. The first stator housing 41A includes at least two members 41AA and 41AB. The member 41AA of the first stator housing 41A, the member 41AB of the first stator housing 41A, the second stator housing 41B, and the third stator housing 41C constituting the stator housing 41 are arranged in order of the second stator housing 41B, the member 41AA of the first stator housing 41A, the member 41AB of the first stator housing 41A, and the third stator housing 41C from the upstream end side toward the downstream end side illustrated in FIG. 1 in the axial direction, and the second stator housing 41B and the member 41AA of the first stator housing 41A, the member 41AA of the first stator housing 41A and the member 41AB of the first stator housing 41A, and the member 41AB of the first stator housing 41A and the third stator housing 41C are fastened by, for example, fastening members such as a plurality of screws. Further, the second stator housing 41B is provided with a hollow hole 23 through which a power cable or a signal cable to a manufactured object manufactured by a semiconductor manufacturing apparatus or a flat display manufacturing apparatus using the motor 1 is inserted.

The rotor housing 42 includes at least two (here, three) cylindrical members 42A, 42B, and 42C which are arranged in the axial direction. The members 42A, 42B, and 42C constituting the rotor housing 42 are arranged in order of the member 42C, the member 42A, and the member 42B from the upstream end side toward the downstream end side illustrated in FIG. 1 of the axial direction, and the member 42C and the member 42A, and the member 42A and the member 42B are respectively fastened by, for example, fastening members such as a plurality of screws.

Additionally, the stator housing 41 and the rotor housing 42 are not limited to the above-described configuration. The stator housing 41 may include, for example, one cylindrical member or two or more cylindrical members. Further, the rotor housing 42 may include, for example, one cylindrical member or two or more cylindrical members.

The motor part 2 including the stator 21 and the rotor 22 is disposed between the stator housing 41 and the rotor housing 42. The stator 21 is connected to the stator housing 41. The stator 21 is fixed to the outer peripheral surface of the stator housing 41. The rotor 22 is connected to the rotor housing 42. The rotor 22 is fixed to the inner peripheral surface of the rotor housing 42.

A bearing 5 is disposed between the stator housing 41 and the rotor housing 42. The bearing 5 includes an inner race 5A, an outer race 5B, and a rolling body 5C which is disposed between the inner race 5A and the outer race 5B. The inner race 5A is sandwiched in the axial direction by the members 41AA and 41AB of the first stator housing 41A. The outer race 5B is sandwiched in the axial direction by the members 42A and 42B of the rotor housing 42. The rotor housing 42 is supported by the stator housing 41 through the bearing 5 to be rotatable about the rotation axis AX.

In the embodiment, the motor part 2, the bearing 5, and the rotation detector 3 are lined up in the axial direction. Accordingly, an increase in size of the motor 1 with respect to a radial direction of the rotation axis AX is suppressed and an increase in installation area (footprint) of the housing 4 is suppressed.

When the rotor 22 rotates relative to the stator 21, the rotor housing 42 rotates relative to the stator housing 41 about the rotation axis AX.

Further, in the embodiment, the motor part 2, the bearing 5, and the rotation detector 3 are arranged in order of the rotation detector 3, the bearing 5, and the motor part 2 from the upstream end side toward the downstream end side illustrated in FIG. 1 of the axial direction. By the above-described configuration, a first space 100A which is surrounded by the member 41AA of the first stator housing 41A, the second stator housing 41B, the member 42A of the rotor housing 42, and the bearing 5, and a second space 100B which is surrounded by the member 41AB of the first stator housing 41A, the third stator housing 41C, the member 42B of the rotor housing 42, and the bearing 5 are formed.

The second stator housing 41B and the member 42C of the rotor housing 42 form a first seal portion 7A while overlapping each other in the entire circumferential direction to have a gap (hereinafter, referred to as a "first gap") 6A of, for example, about 0.1 mm to 0.5 mm in the axial direction. In the embodiment, as illustrated in FIG. 1, an outer diameter r1 of the second stator housing 41B is larger than an inner diameter r2 of the member 42C of the rotor housing 42. Thus, a range W1 in which the second stator housing 41B and the member 42C of the rotor housing 42 overlap each other in the axial direction with the first gap 6A interposed therebetween becomes the first seal portion 7A. Further, the member 41AA of the first stator housing 41A and the second stator housing 44-41B are fixed to each other through a first annular member 10 which forms a gap (hereinafter, referred to as a "second gap") 8A of, for example, about several micrometers to several tens of micrometers in the axial direction.

Figure 2A:
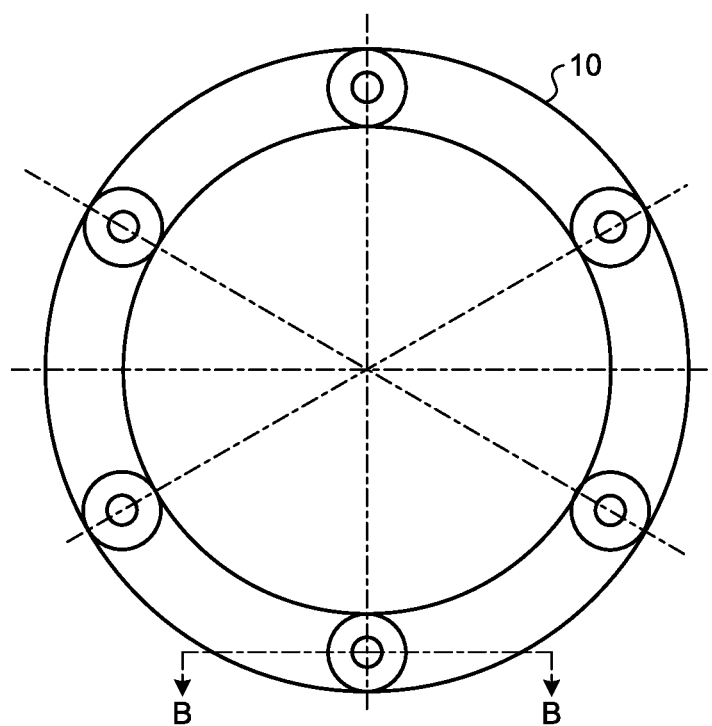
FIGS. 2A and 2B are diagrams illustrating an example of a first annular member of the first embodiment.
Figure 2B:
Figure 3A:
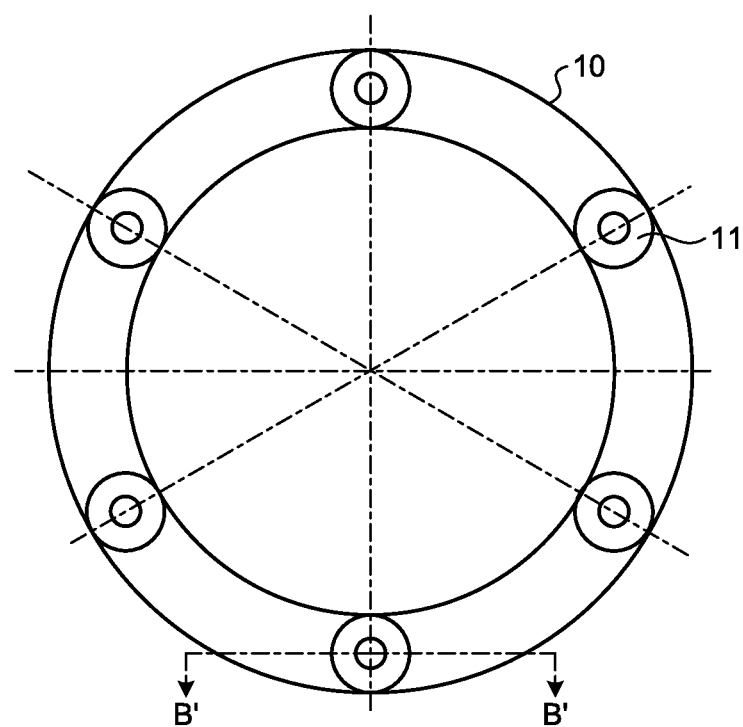
FIGS. 3A and 3B are diagrams illustrating an example different from the first annular member of the first embodiment illustrated in FIGS. 2A and 2B.
Figure 3B:
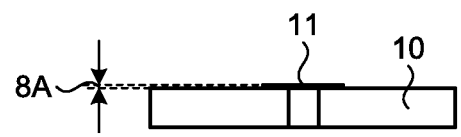

FIGS. 2A and 2B are diagrams illustrating an example of the first annular member of the first embodiment. FIG. 2A is a top view illustrating the first annular member 10 when viewed from the direction A of FIG. 1. FIG. 2B is a cross-sectional view taken along a line B-B of FIG. 2A of the first annular member 10. FIGS. 3A and 3B are diagrams illustrating an example different from the first annular member of the first embodiment illustrated in FIGS. 2A and 2B. FIG. 3A is a top view illustrating the first annular member 10 when viewed from the direction A of FIG. 1. FIG. 3B is a cross-sectional view illustrating the first annular member 10 when taken along a line B'-B' of FIG. 3A Additionally, in the examples illustrated in FIGS. 2A, 2B, 3A, and 3B, six screw holes for sandwiching and fixing the first annular member 10 between the first stator housing 41A and the second stator housing 41B are provided, but the number of the screw holes is not limited thereto.

In the example illustrated in FIGS. 2A and 2B, as illustrated in FIG. 1, a surface facing the first annular member 10 in the second stator housing 41B is flat and a surface of the first annular member 10 facing the second stator housing 41B is provided with a step for forming the second gap 8A with respect to the second stator housing 41B. Specifically, an axial thickness in the periphery of the screw hole provided at the first annular member 10 is thicker than the other portions by the degree corresponding to the second gap 8A. Accordingly, when the second stator housing 41B and the first annular member 10 are combined with each other, the first annular member 10 and the second stator housing 41B form a first aperture portion 9A in the entire circumferential direction to be separated from the second gap 8A and overlap each other in the range of a radial width W2 of an outer diameter r3 and an inner diameter r4 of the first annular member 10.

Differently from the above-described example, a surface facing the second stator housing 41B in the first annular member 10 may not be provided with a step for forming the second gap 8A with respect to the second stator housing 41B and a surface facing the first annular member 10 in the second stator housing 41B may be provided with a step for forming the second gap 8A with respect to the first annular member 10.

In the example illustrated in FIGS. 3A and 3B, a spacer member 11 that forms the second gap 8A is provided between the first annular member 10 and the second stator housing 41B. Specifically, the flat washer-shaped spacer member 11 having a thickness corresponding to the second gap 8A in the axial direction is interposed between the first annular member 10 and the second stator housing 41B.

By the above-described configuration, the flatness of the surface facing the first annular member 10 in the second stator housing 41B, the flatness of the surface facing the second stator housing 41B in the first annular member 10, and the step forming the second gap 8A between the first annular member 10 and the second stator housing 41B may be provided as management items. In this case, there is a merit that the number of the component accuracy management items is reduced. As a result, the yield is improved.

Further, in the embodiment, an inner diameter r6 of the second stator housing 41B is smaller than an inner diameter r5 of the first stator housing 41A, and the second stator housing 41B includes a fitting portion which is fitted to the first stator housing 41A while facing the inside thereof in the radial direction. A first exhaust groove 12A is formed in the entire circumferential direction of the fitting portion to suck and discharge air inside the first space 100A through the second gap 8A of the first aperture portion 9A. Further, a first exhaust hole 13A which is opened to the lower axial end in the range of a radial width W3 of the inner diameter (that is, the diameter of the fitting portion) r5 of the first stator housing 41A and the inner diameter (that is, the diameter of the hollow hole 23) r6 of the second stator housing 41B and is connected to, for example, an exhaust tube 15A of a suction exhaust device P1 which is a vacuum pump through a joint 14A is provided at the second stator housing 41B to communicate with the first exhaust groove 12A. Then, a groove portion 16 is formed at a fitting surface overlapping the member 41AA of the first stator housing 41A in the second stator housing 41B in the radial direction and an O-ring 17 is provided at the groove portion 16. Since the O-ring 17 is sandwiched between the second stator housing 41B and the member 41AA of the first stator housing 41A, the airtightness of the fitting surface formed by the overlapping of the member 41AA of the first stator housing 41A and the second stator housing 41B in the radial direction is maintained. Additionally, when the member 41AA of the first stator housing 41A and the second stator housing 41B are fitted to each other with high accuracy, the processing of the groove portion 16 of the second stator housing 41B and the O-ring 17 can be omitted, but since the groove portion 16 and the O-ring 17 are provided, the processing accuracy of the fitting surface between the member 41AA of the first stator housing 41A and the second stator housing 41B can be roughly set and thus an allowable range can be widened. As a result, the yield is improved.

The third stator housing 41C and the member 42B of the rotor housing 42 form a second seal portion 7B while overlapping each other in the entire circumferential direction to have a gap (hereinafter, referred to as a "first gap") 6B of, for example, about 0.1 mm to 0.5 mm in the radial direction. In the embodiment, as illustrated in FIG. 1, a range L1 in which the third stator housing 41C and the member 42B of the rotor housing 42 overlap each other in the radial direction with the first gap 6B interposed therebetween becomes the second seal portion 7B. Further, a second annular member 18 which forms a gap (hereinafter, referred to as a "second gap") 8B of, for example, about several micrometers to several tens of micrometers in the axial direction is fixed to the third stator housing 41C.

Figure 4:
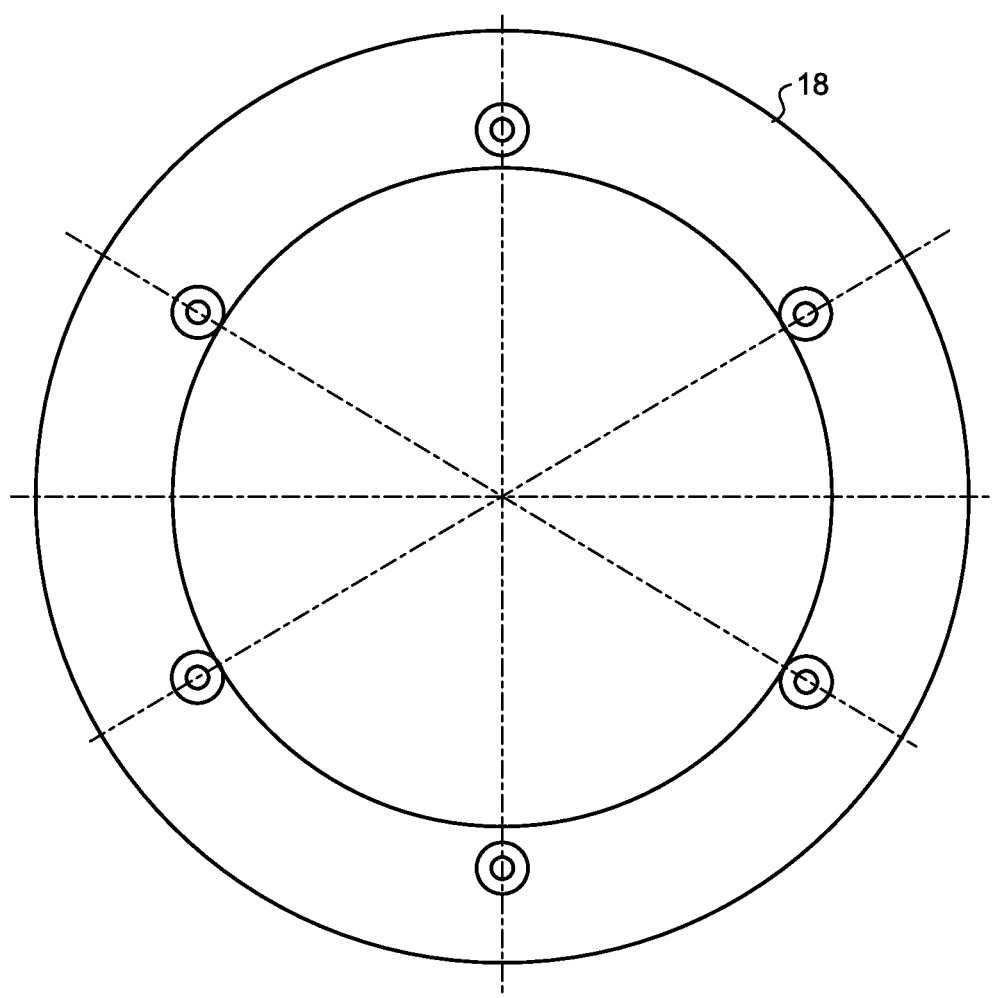
FIG. 4 is a diagram illustrating an example of a second annular member of the first embodiment.
Figure 5:
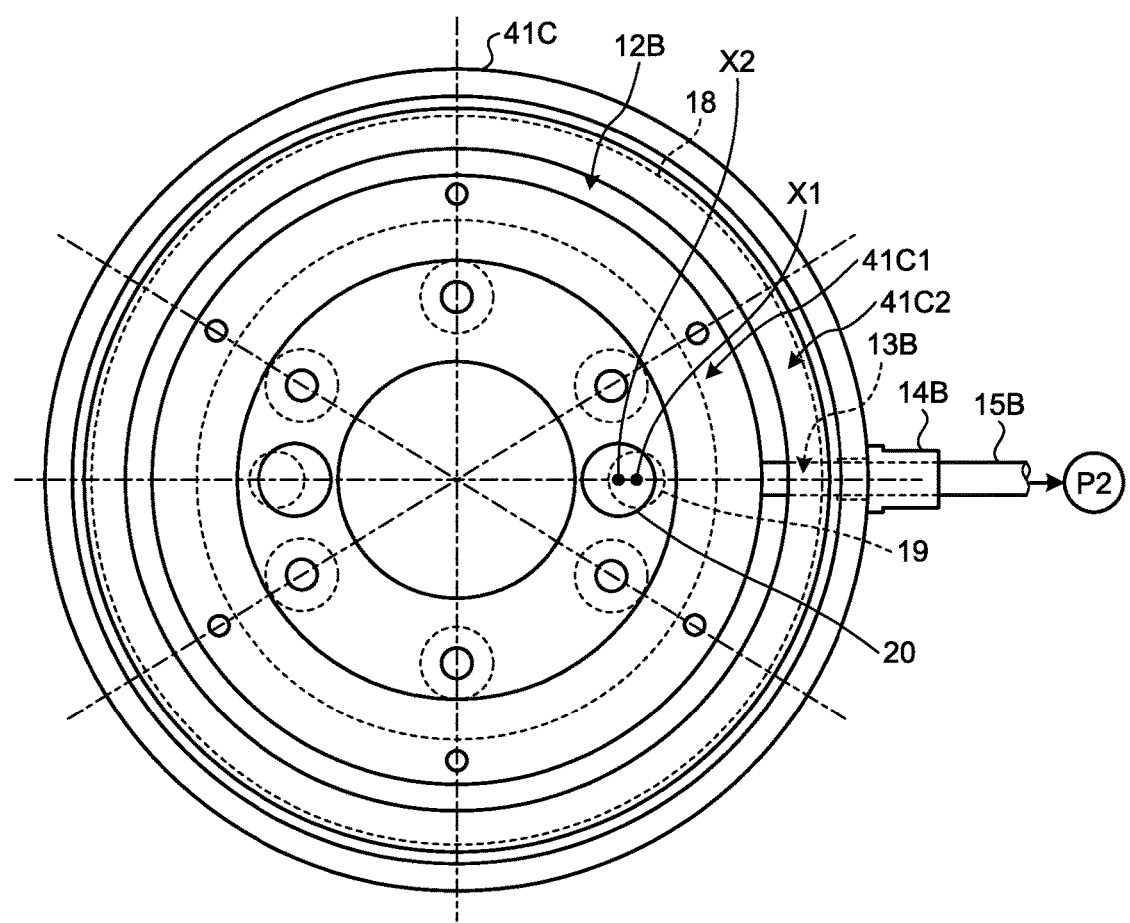
FIG. 5 is a diagram illustrating an example of a third stator housing of the first embodiment.

FIG. 4 is a diagram illustrating an example of the second annular member of the first embodiment. In the example illustrated in FIG. 4, the second annular member 18 is viewed as a top view in the direction A of FIG. 1. FIG. 5 is a diagram illustrating an example of the third stator housing of the first embodiment. In the example illustrated in FIG. 5, the third stator housing 41C is viewed as a top view in the direction A of FIG. 1. Additionally, in the examples illustrated in FIGS. 4 and 5, six screw holes for fixing the second annular member 18 to the third stator housing 41C are provided, but the number of the screw holes is not limited thereto.

In the examples illustrated in FIGS. 4 and 5, as illustrated in FIG. 1, a surface facing the third stator housing 41C in the second annular member 18 is flat and a surface 41C1 and a surface 41C2 facing the second annular member 18 in the third stator housing 41C are provided with a step forming the second gap 8B with respect to the second annular member 18. Accordingly, when the third stator housing 41C and the second annular member 18 are combined with each other, the second annular member 18 and the third stator housing 41C form a second aperture portion 9B in the entire circumferential direction to overlap each other with the second gap 8B interposed therebetween.

Differently from the above-described example, a step may not be provided by the surface 41C1 and the surface 41C2 facing the second annular member 18 in the third stator housing 41C, and a step forming the second gap 8B with respect to the third stator housing 41C may be provided at a surface facing the third stator housing 41C in the second annular member 18. Further, in the example illustrated in FIG. 1, an example has been described in which the second aperture portion 9B is formed at an outer radial area in which the third stator housing 41C and the second annular member 18 overlap each other. However, in order to form the second aperture portion 9B in the inner radial area in which the third stator housing 41C and the second annular member 18 overlap each other, a step may be provided at a surface facing the second annular member 18 in the third stator housing 41C or a step may be provided at a surface facing the third stator housing 41C in the second annular member 18. Further, in order to form the second aperture portion 9B at both sides in the radial direction in which the third stator housing 41C and the second annular member 18 overlap each other, the third stator housing 41C and the second annular member 18 may contact each other only in the periphery of the screw hole.

Further, a spacer member that forms the second gap 8B may be provided between the third stator housing 41C and the second annular member 18. Further, the spacer member may be formed as a flat washer-shaped member having a thickness corresponding to the second gap 8A in the axial direction so that the second aperture portion 9B is formed at both sides in the radial direction in which the third stator housing 41C and the second annular member 18 overlap each other.

By the above-described configuration, the flatness of the surface facing the second annular member 18 in the third stator housing 41C, the flatness of the surface facing the third stator housing 41C in the second annular member 18, and the step forming the second gap 8B between the second annular member 18 and the third stator housing 41C may be provided as management items. In this case, there is a merit that the number of the component accuracy management items is reduced. As a result, the yield is improved.

Further, as illustrated in FIGS. 1 and 5, in the embodiment, a second exhaust groove 12B is formed in the entire circumferential direction of the third stator housing 41C to suck and discharge air inside the second space 100B through the second gap 8B of the second aperture portion 9B. In the embodiment, as illustrated in FIG. 1, an outer diameter r7 of the second annular member 18 is larger than an outer diameter r8 of the second exhaust groove 12B formed at the third stator housing 41C. Thus, a range W4 in which the second annular member 18 and the third stator housing 41C overlap each other with the second gap 8B in the axial direction interposed therebetween becomes the second aperture portion 9B. Further, a second exhaust hole 13B which is opened to an outer circumferential surface in the radial direction and is connected to, for example, an exhaust tube 15B of a suction exhaust device P2 which is a vacuum pump through a joint 14B is provided at the third stator housing 41C to communicate with the second exhaust groove 12B.

Further, as illustrated in FIG. 1, in the embodiment, the first stator housing 41A is provided with a first cable insertion hole 19 which is formed in the axial direction so that the cables 200A and 200B are inserted therethrough, and the third stator housing 41C is provided with a second cable insertion hole 20 which communicates with the first cable insertion hole 19 and is formed in the axial direction so that the cables 200A and 200B are inserted therethrough. Additionally, in the example illustrated in FIG. 1, the first cable insertion hole 19 and the second cable insertion hole 20 for the cable 200A are not illustrated in the drawings.

As illustrated in FIGS. 1 and 5, the first cable insertion hole 19 and the second cable insertion hole 20 are formed so that positions overlapping the axial direction deviate from each other. Specifically, when the first stator housing 41A and the third stator housing 41C are fitted to each other in the axial direction, a radial center position X1 of the first cable insertion hole 19 and a radial center position X2 of the second cable insertion hole 20 are different from each other so that an opening area in which the first cable insertion hole 19 and the second cable insertion hole 20 overlap each other in the axial direction becomes substantially the same as the cross-sectional areas of the cables 200A and 200B. Accordingly, the airtightness of the opening portion in which the first cable insertion hole 19 and the second cable insertion hole 20 overlap each other in the axial direction is maintained.

A motor which is assumed to be used in a semiconductor manufacturing apparatus or a flat panel display manufacturing apparatus, and an actuator including the motor are required to have high reliability. Further, in the manufacturing of a semiconductor element or a flat panel display, a manufacturing process needs to be performed under a clean environment in order to prevent dust from being mixed with a manufactured object. A motor or an actuator which is used under such a clean environment needs to prevent dust generated inside the motor or the actuator from flowing to the outside in order to ensure high reliability.

As the dust generated inside the motor or the actuator, dust of a lubricating grease used in a bearing or the like is considered. Dust particles generated from the lubricating grease can be contaminant sources in a manufacturing process of a semiconductor element or a flat panel display under a clean environment, causing a defect degrading the value of a product, for example. For this reason, in the motor or the actuator used in the manufacturing process of the semiconductor element or the flat panel display or the like, a low dust generating grease having low dust generation is generally used as a lubricating grease to be used for bearings or the like.

In the embodiment, in the above-described configuration, the suction exhaust device P1 is connected to the first exhaust hole 13A provided at the second stator housing 41B. Further, the suction exhaust device P2 is connected to the second exhaust hole 13B provided at the third stator housing 41C. Then, when the suction exhaust devices P1 and P2 are operated, air of the first space 100A formed inside the motor 1 is sucked through the first exhaust hole 13A, the first exhaust groove 12A, and the second gap 8A of the first aperture portion 9A and air of the second space 100B formed inside the motor 1 is sucked through the second exhaust hole 13B, the second exhaust groove 12B, and the second gap 8B of the second aperture portion 9B.

In the motor 1 of the first embodiment, since the first aperture portion 9A and the second aperture portion 9B are formed in the entire circumferential direction and the second gap 8A of the first aperture portion 9A and the second gap 8B of the second aperture portion 9B are extremely small to be several micrometers to several tens of micrometers, the air pressure inside the exhaust grooves 12A and 12B is uniform even when the suction exhaust devices P1 and P2 have small air sucking power and small exhaust volume. For this reason, air inside the first space 100A and the second space 100B is uniformly sucked in the entire circumferential direction of the first aperture portion 9A and the second aperture portion 9B. Accordingly, it is possible to suppress a difference in pressure inside the first space 100A and the second space 100B in the circumferential direction.

Further, as described above, in the motor 1 according to the first embodiment, the first gaps 6A and 6B of the first seal portion 7A and the second seal portion 7B are, for example, about 0.1 mm to 0.5 mm and are larger than the second gaps 8A and 8B of the first aperture portion 9A and the second aperture portion 9B. However, since a difference in pressure of the first space 100A and the second space 100B in the circumferential direction is suppressed by the first aperture portion 9A and the second aperture portion 9B, air is uniformly sucked into the first space 100A and the second space 100B in the entire circumferential direction of the first seal portion 7A and the second seal portion 7B even when the first gaps 6A and 6B of the first seal portion 7A and the second seal portion 7B are relatively large to be, for example, about 0.1 mm to 0.5 mm. That is, in the motor 1 according to the first embodiment, since air is uniformly sucked into the first space 100A and the second space 100B in the entire circumferential direction of the first seal portion 7A and the second seal portion 7B, a difference in pressure in the circumferential direction of the first space 100A and the second space 100B is suppressed by the first aperture portion 9A and the second aperture portion 9B, and thus dust generated in the first space 100A and the second space 100B can be reliably prevented from flowing to the outside.

In this way, since the motor 1 according to the first embodiment can function the first seal portion 7A and the second seal portion 7B with a small displacement, it is possible to more reliably prevent dust generated in the first space 100A and the second space 100B formed inside the motor 1 from flowing to the outside.

Further, since it is possible to prevent dust generated inside the motor 1 from flowing from the first seal portion 7A and the second seal portion 7B to the outside, a mechanical bearing such as a roller bearing or a sliding bearing which does not need an external power source such as power or compressed air can be used as the bearing 5 in the motor 1 according to the first embodiment.

Further, a low dust generating grease having low dust generation does not need to be used as the lubricating grease for lubricating a movable portion like the bearing 5 and the like and an optimal lubricating grease can be used in response to a driving condition.

Further, in the configuration of the motor 1 according to the embodiment, the flatness of the surface facing the first annular member 10 of the second stator housing 41B, the flatness of the surface facing the second stator housing 41B in the first annular member 10, and the step forming the second gap 8A between the first annular member 10 and the second stator housing 41B may be provided as management items in order to manage the accuracy of the second gap 8A forming the first aperture portion 9A. Further, the flatness of the surface facing the second annular member 18 in the third stator housing 41C, the flatness of the surface facing the third stator housing 41C in the second annular member 18, and the step forming the second gap 8B between the second annular member 18 and the third stator housing 41C may be provided as management items in order to manage the accuracy of the second gap 8B forming the second aperture portion 9B. For this reason, since the number of the component accuracy management items is reduced, the yield of the motor 1 can be improved.

As described above, the motor 1 according to the first embodiment includes the stator 21 which includes the coil 21B and the stator core 21A, the rotor 22 which is disposed at the outside of the stator 21 in the radial direction and rotates relative to the stator 21, the rotor housing 42 which rotates along with the rotor 22, the stator housing 41 which fixes the stator 21 thereto, and the bearing 5 which supports the rotor housing 42 to be rotatable relative to the stator housing 41. The stator housing 41 includes the first stator housing 41A, the second stator housing 41B, and the third stator housing 41C. The second stator housing 41B forms the first space 100A along with the first stator housing 41A, the rotor housing 42, and the bearing 5 and overlaps the rotor housing 42 with the first gap 6A interposed therebetween in the entire circumferential direction. The third stator housing 41C forms the second space 100B along with the first stator housing 41A, the rotor housing 42, and the bearing 5 and overlaps the rotor housing 42 with the first gap 6B interposed therebetween in the entire circumferential direction. Further, the motor 1 includes the first annular member 10 which overlaps the second stator housing 41B with the second gap 8A interposed therebetween in the entire circumferential direction inside the first space 100A, the first exhaust hole 13A which sucks and discharges air inside the first space 100A through the second gap 8A, the first exhaust groove 12A which is interposed between the second gap 8A and the first exhaust hole 13A and is formed at the second stator housing 41B in the entire circumferential direction along the second gap 8A, the second annular member 18 which overlaps the third stator housing 41C with the second gap 8B interposed therebetween in the entire circumferential direction inside the second space 100B, the second exhaust hole 13B which sucks and discharges air inside the second space 100B through the second gap 8B, and the second exhaust groove 12B which is interposed between the second gap 8B and the second exhaust hole 13B and is formed at the third stator housing 41C in the entire circumferential direction along the second gap 8B.

In this structure, since the suction exhaust device P1 is connected to the first exhaust hole 13A and the suction exhaust device P1 is operated, air of the first space 100A is uniformly sucked out from the first exhaust hole 13A, and air is uniformly sucked into the first space 100A from the first seal portion 7A. Accordingly, it is possible to reliably prevent dust generated in the first space 100A from flowing to the outside.

Further, since the suction exhaust device P2 is connected to the second exhaust hole 13B and the suction exhaust device P2 is operated, air of the second space 100B is uniformly sucked out from the second exhaust hole 13B and air is uniformly sucked into the second space 100B from the second seal portion 7B. Accordingly, it is possible to reliably prevent dust generated in the second space 100B from flowing to the outside.

Further, the motor 1 can reduce the number of the management items for managing the accuracy of the second gap 8A forming the first aperture portion 9A and the second gap 8B forming the second aperture portion 9B. As a result, it is possible to improve the yield when manufacturing the motor 1.

Further, the motor 1 can use a mechanical bearing such as a roller bearing or a sliding bearing which does not need an external power source such as power or compressed air.

Further, the motor 1 does not need a low dust grease having low dust generation as a lubricating grease for lubricating the movable portion and can use an optimal lubricating grease in response to a driving condition.

Second Embodiment

Figure 6:
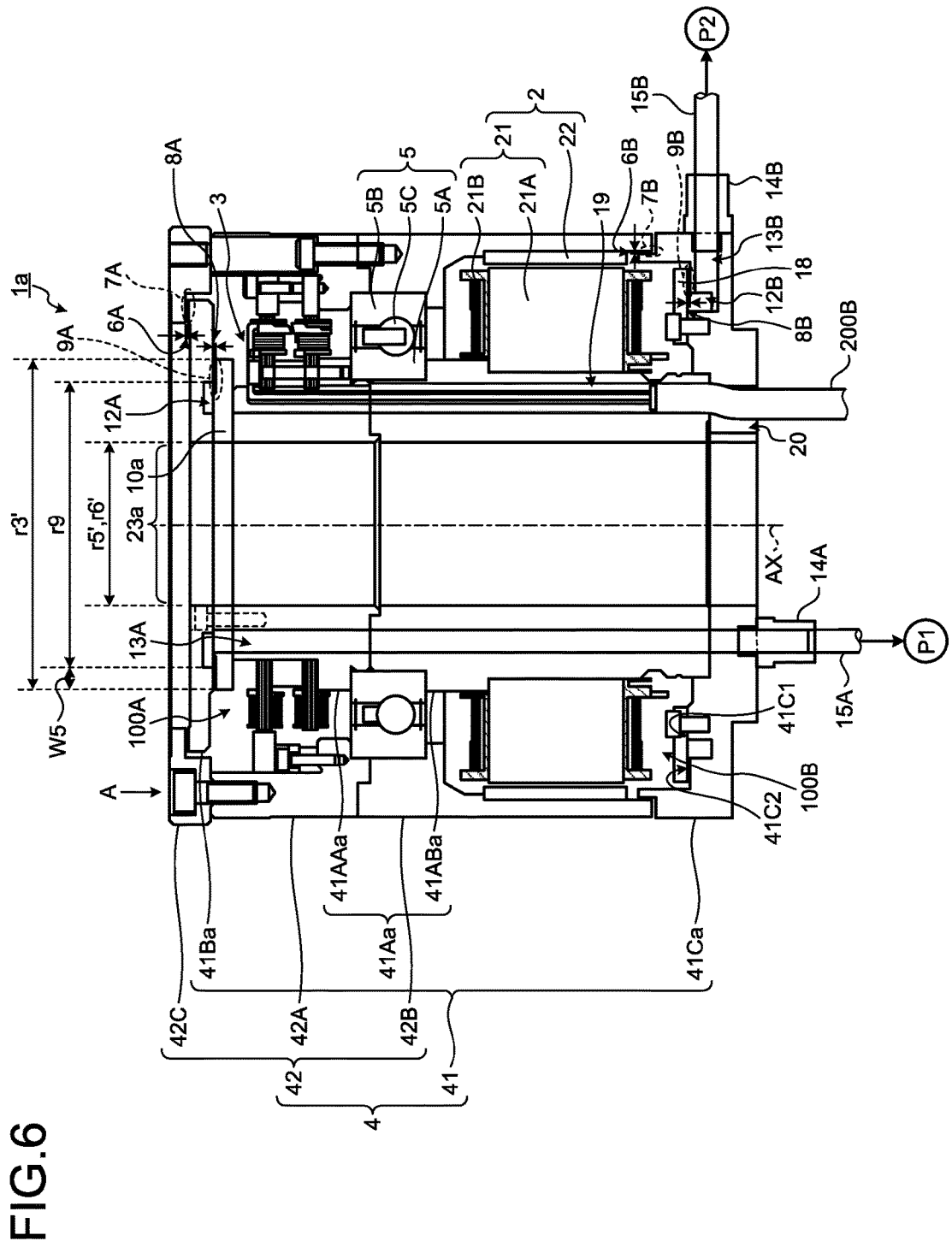
FIG. 6 is a cross-sectional view illustrating an example of a motor according to a second embodiment.

FIG. 6 is a cross-sectional view illustrating an example of a motor according to a second embodiment. Further, the same reference numerals will be given to the same components as those of the first embodiment and repetitive description will be omitted.

As illustrated in FIG. 6, in a motor 1a according to the second embodiment, the first exhaust groove 12A is formed in the entire circumferential direction of a fitting surface with respect to a first annular member 10a in a second stator housing 41Ba to suck and discharge air inside the first space 100A through the second gap 8A of the first aperture portion 9A. Further, the second stator housing 41Ba does not include a fitting portion which is fitted to a first stator housing 41Aa while facing the inside in the radial direction, and the first exhaust hole 13A which communicates with the first exhaust groove 12A allows the second stator housing 41Ba, the first annular member 10a, the first stator housing 41Aa, and a third stator housing 41Ca arranged in the axial direction to communicate with one another and is opened to the lower end of the third stator housing 41Ca in the axial direction. Accordingly, it is possible to enlarge an inner diameter (that is, the diameter of a hollow hole 23a) r6' of the second stator housing 41B to an inner diameter r5' of the first stator housing 41A. Thus, it is possible to increase the diameter of the hollow hole 23a which is opened to the upper end of the second stator housing 41Ba in the axial direction to be larger than that of the first embodiment.

Figure 7A:
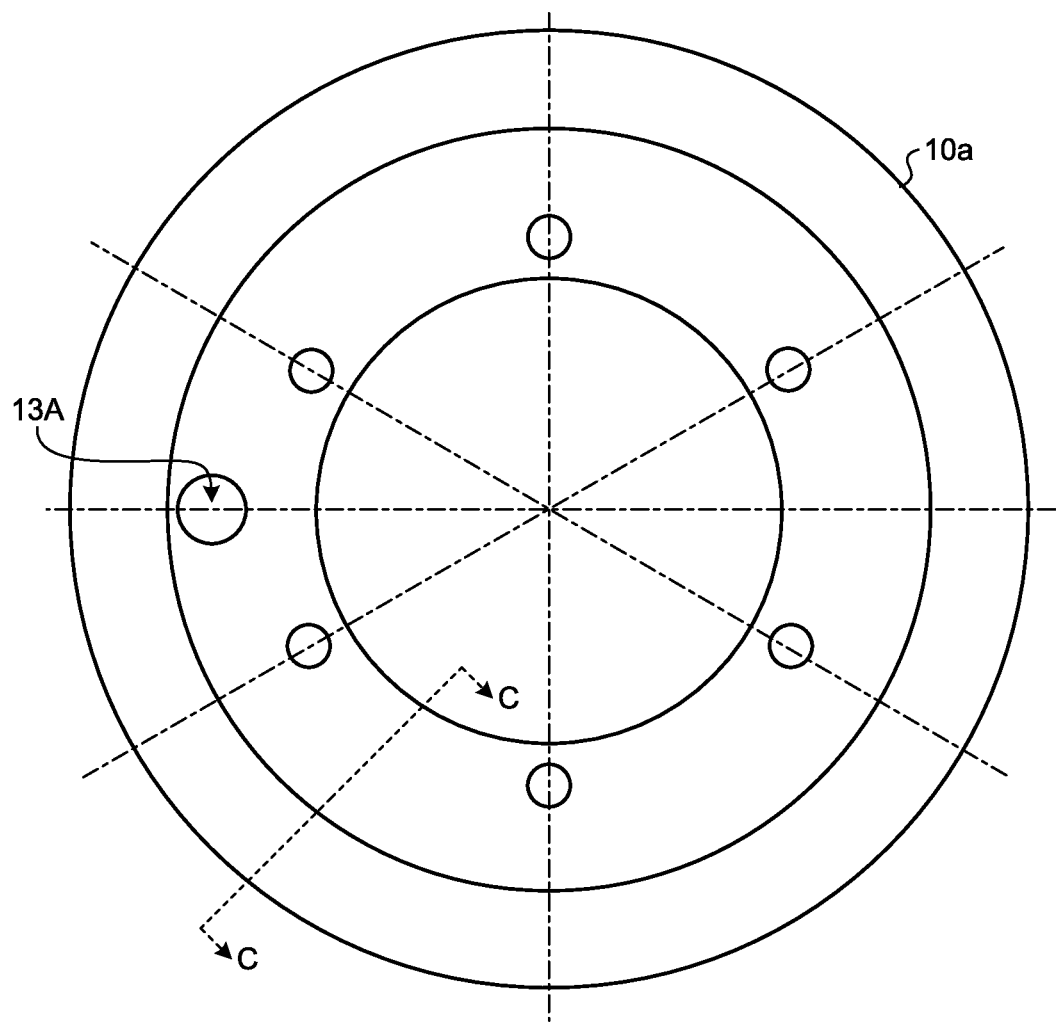
FIGS. 7A and 7B are diagrams illustrating an example of a first annular member of the second embodiment.
Figure 7B:
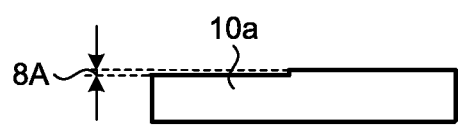
Figure 8A:
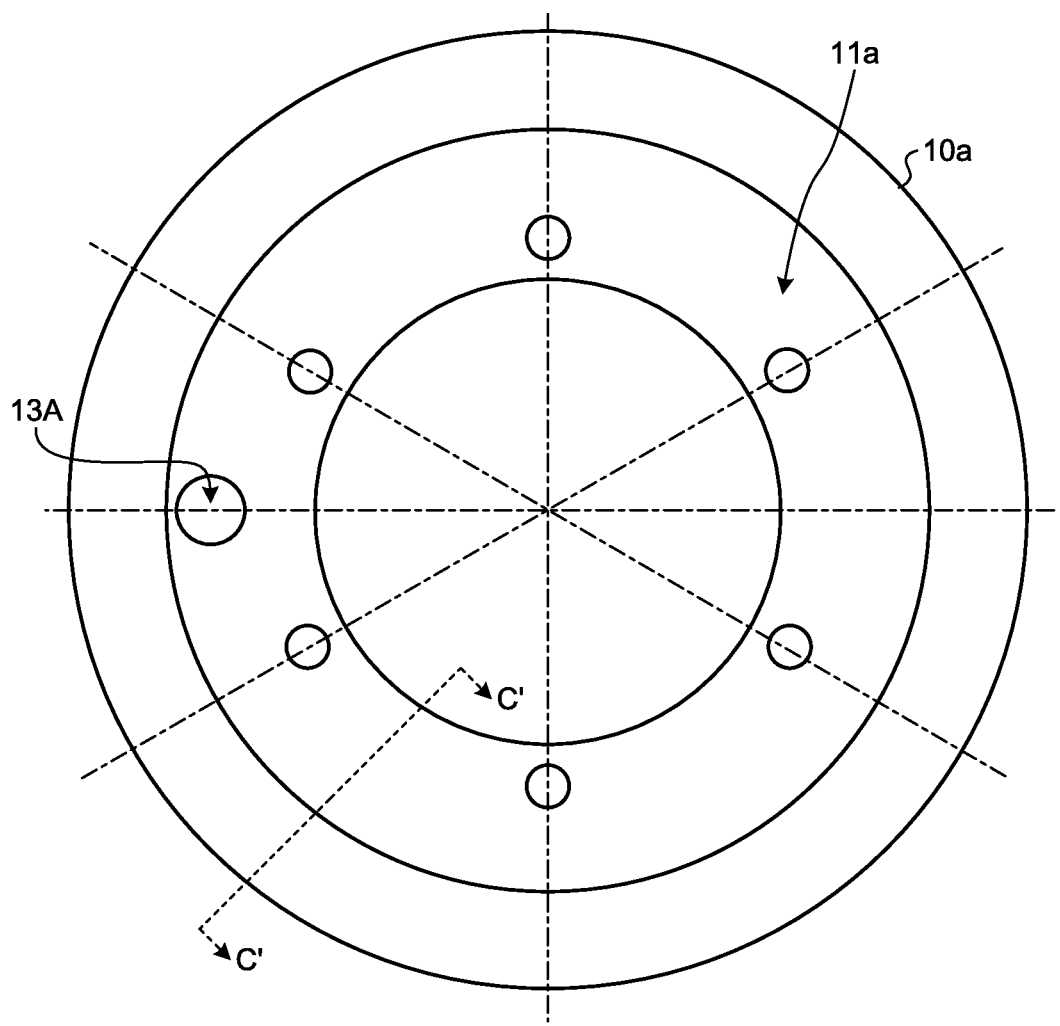
FIGS. 8A and 8B are diagrams illustrating an example different from the first annular member of the second embodiment illustrated in FIGS. 7A and 7B.
Figure 8B:
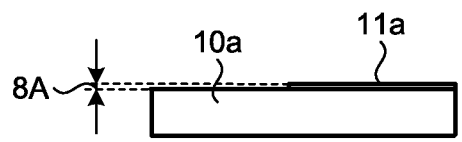

FIGS. 7A and 7B are diagrams illustrating an example of the first annular member of the second embodiment. FIG. 7A is a top view illustrating the first annular member 10a when viewed from the direction A of FIG. 6. FIG. 7B is a cross-sectional view illustrating the first annular member 10a when taken along a line C-C of FIG. 7A. FIGS. 8A and 8B are diagrams illustrating an example different from the first annular member of the second embodiment illustrated in FIGS. 7A and 7B. FIG. 8A is a top view illustrating the first annular member 10a when viewed from the direction A of FIG. 6. FIG. 8B is a cross-sectional view illustrating the first annular member 10a when taken along a line C-C' of FIG. 8A. Additionally, in the examples illustrated in FIGS. 7A, 7B, 8A, and 8B, six screw holes for fixing the first annular member 10a between the first stator housing 41Aa and the second stator housing 41Ba are provided, but the number of the screw holes is not limited thereto.

In the example illustrated in FIGS. 7A and 7B, as illustrated in FIG. 6, a surface facing the first annular member 10a in the second stator housing 41Ba is flat and a surface facing the second stator housing 41Ba in the first annular member 10a is provided with a step forming the second gap 8A with respect to the second stator housing 41Ba. Accordingly, when the second stator housing 41Ba and the first annular member 10a are combined with each other, the first annular member 10a and the second stator housing 41Ba form the first aperture portion 9A while overlapping each other with the second gap 8A interposed therebetween in the entire circumferential direction. In the embodiment, as illustrated in FIG. 6, an outer diameter r3' of the first annular member 10a is larger than an outer diameter r9 of the first exhaust groove 12A formed at the second stator housing 41B. Thus, a range W5 in which the first annular member 10a and the second stator housing 41B overlap each other with the second gap 8A interposed therebetween in the axial direction becomes the second aperture portion 9B.

Differently from the above-described example, a step may not be provided at a surface facing the second stator housing 41Ba in the first annular member 10a, and a step forming the second gap 8A with respect to the first annular member 10a may be provided at a surface facing the first annular member 10a in the second stator housing 41Ba.

Further, as illustrated in FIGS. 8A and 8B, an annular spacer member 11a forming the second gap 8A may be provided between the first annular member 10a and the second stator housing 41Ba.

By the above-described configuration, the flatness of the surface facing the first annular member 10a in the second stator housing 41Ba, the flatness of the surface facing the second stator housing 41Ba in the first annular member 10a, and the step forming the second gap 8A between the first annular member 10a and the second stator rhousing 41Ba may be provided as management items. In this case, there is a merit that the number of the component accuracy management items is reduced. As a result, the yield is improved.

Also in the embodiment, it is possible to obtain the same effect as that of the first embodiment. That is, in the motor 1a according to the second embodiment, since the suction exhaust devices P1 and P2 are respectively connected to the first exhaust hole 13A and the second exhaust hole 13B and the suction exhaust devices P1 and P2 are operated, air of the first space 100A and the second space 100B is uniformly sucked out from the first exhaust hole 13A and the second exhaust hole 13B, and air is uniformly sucked into the first space 100A and the second space 100B from the first seal portion 7A and the second seal portion 7B. Accordingly, it is possible to reliably prevent dust generated in the first space 100A and the second space 100B from flowing to the outside.

Further, the motor 1a can reduce the number of the management items for managing the accuracy of the second gap 8A forming the first aperture portion 9A and the second gap 8B forming the second aperture portion 9B. As a result, it is possible to improve the yield when manufacturing the motor 1a.

Further, the motor 1a can use a mechanical bearing such as a roller bearing or a sliding bearing which does not need an external power source such as power or compressed air.

Further, the motor 1a does not need a low dust grease having low dust generation as a lubricating grease for lubricating the movable portion and can use an optimal lubricating grease in response to a driving condition.

Third Embodiment

Figure 10:
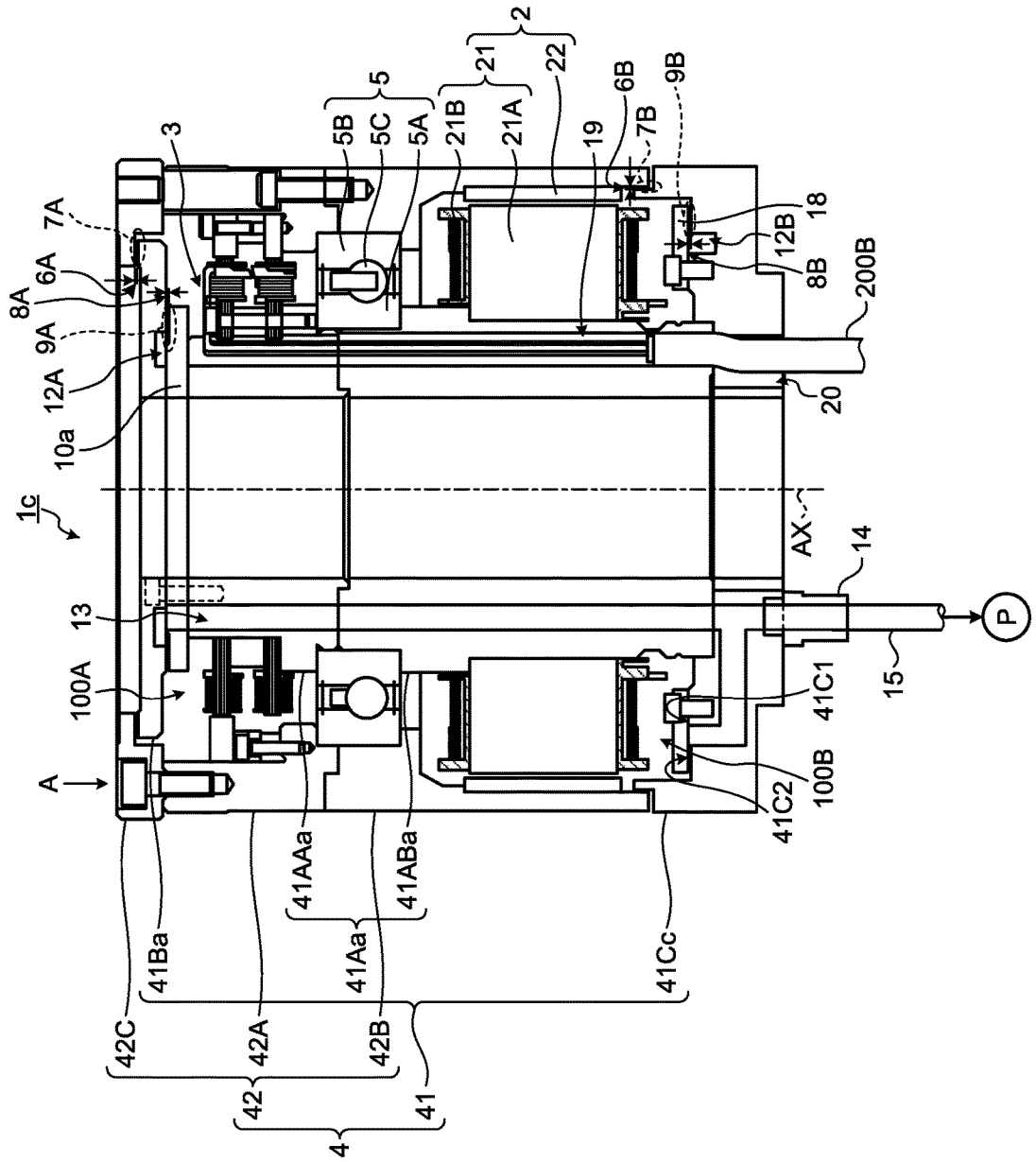
FIG. 10 is a cross-sectional view illustrating an example different from the motor according to the third embodiment illustrated in FIG. 9.

FIG. 9 is a cross-sectional view illustrating an example of a motor according to a third embodiment. FIG. 10 is a cross-sectional view illustrating an example different from the motor according to the third embodiment illustrated in FIG. 9. Further, the same reference numerals will be given to the same components as those of the first or second embodiment and repetitive description will be omitted.

As illustrated in FIG. 9, in the motor 1b according to the third embodiment, the first exhaust groove 12A formed at the second stator housing 41Ba and the second exhaust groove 12B formed at a third stator housing 41Cb communicate with each other through an exhaust hole 13. In the example illustrated in FIG. 9, the exhaust hole 13 is opened to an outer circumferential surface in the radial direction of the third stator housing 41Cb, and an exhaust tube 15 is connected to, for example, the suction exhaust device P such as a vacuum pump through a joint 14.

Further, as illustrated in FIG. 10, in the motor 1c according to the third embodiment, the first exhaust groove 12A formed at the second stator housing 41Ba and the second exhaust groove 12B formed at the third stator housing 41Cc communicate with each other through the exhaust hole 13. In the example illustrated in FIG. 10, the exhaust hole 13 is opened to the lower end of the third stator housing 41Cc in the axial direction and the exhaust tube 15 is connected to, for example, the suction exhaust device P such as a vacuum pump through the joint 14.

In the motor 1b or 1c according to the third embodiment, it is possible to obtain the same effect as those of the first and second embodiments by connecting one suction exhaust device P to the exhaust hole 13. That is, in the motor 1b or 1c according to the third embodiment, since the suction exhaust device P is connected to the exhaust hole 13 and the suction exhaust device P is operated, air of the first space 100A and the second space 100B is uniformly sucked out from the exhaust hole 13, and air is uniformly sucked into the first space 100A and the second space 100B from the first seal portion 7A and the second seal portion 7B. Accordingly, it is possible to reliably prevent dust generated in the first space 100A and the second space 100B from flowing to the outside.

Further, the motor 1b or 1c can reduce the number of the management items for managing the accuracy of the second gap 8A forming the first aperture portion 9A and the second gap 8B forming the second aperture portion 9B. As a result, it is possible to improve the yield when manufacturing the motor 1b or 1c.

Further, the motor 1b or 1c can use a mechanical bearing such as a roller bearing or a sliding bearing which does not need an external power source such as power or compressed air.

Further, the motor 1b or 1c does not need a low dust grease having low dust generation as a lubricating grease for lubricating the movable portion and can use an optimal lubricating grease in response to a driving condition.

Modified Example

Figure 11:
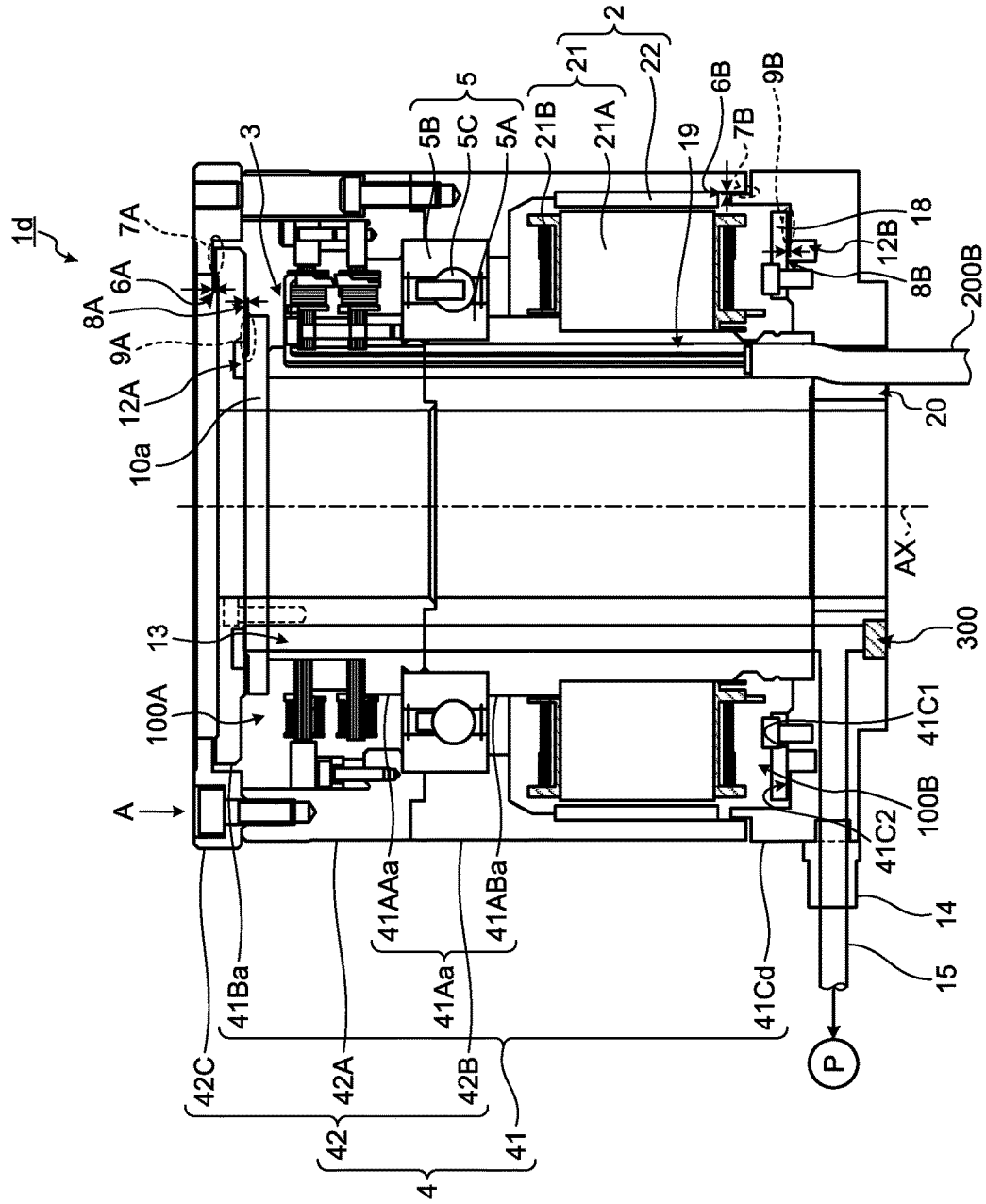
FIG. 11 is a cross-sectional view illustrating an example of a motor according to a modified example of the third embodiment.
Figure 12:
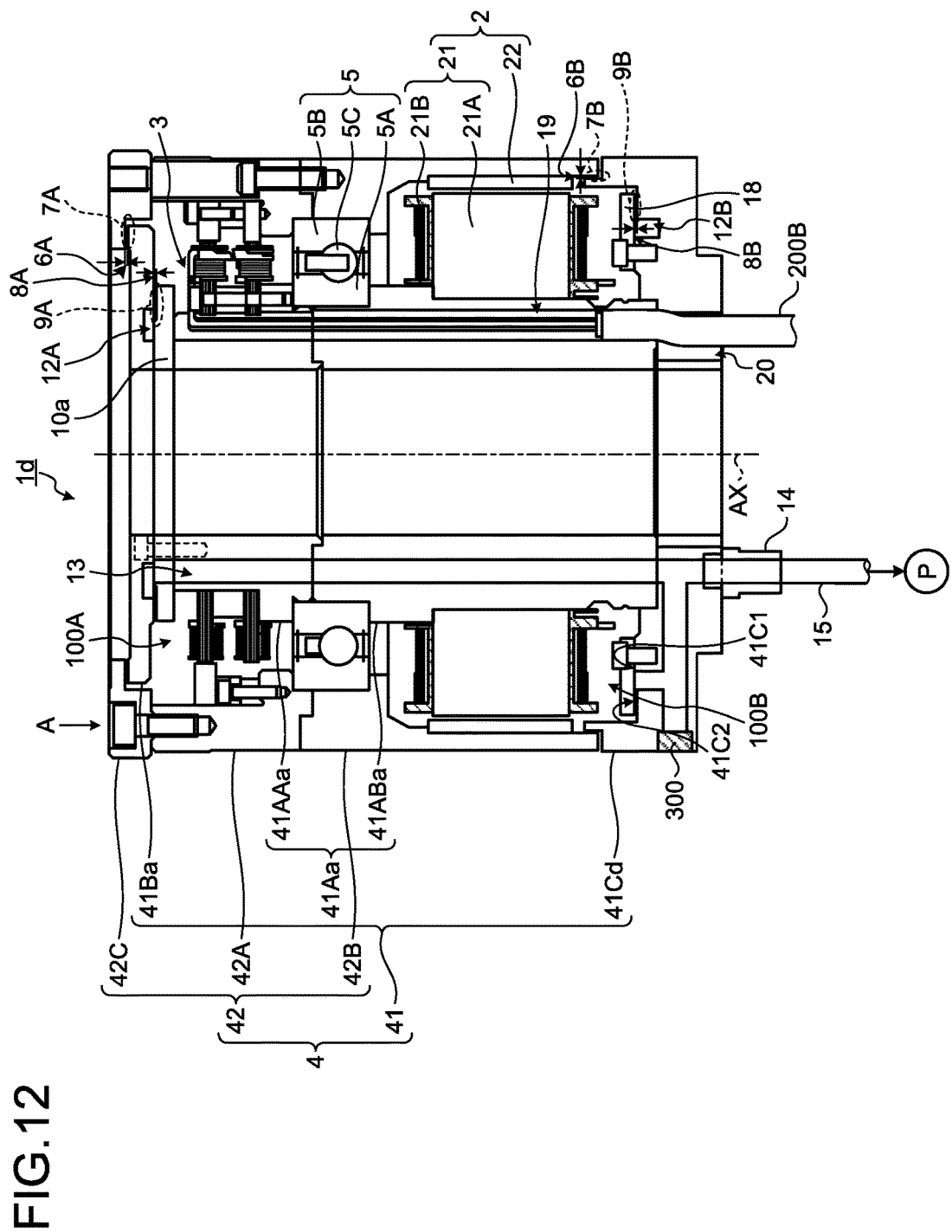
FIG. 12 is a cross-sectional view illustrating an example different from the motor according to the modified example of the third embodiment illustrated in FIG. 11.

FIG. 11 is a cross-sectional view illustrating an example of a motor according to a modified example of the third embodiment. FIG. 12 is a cross-sectional view illustrating an example different from the motor according to the modified example of the third embodiment illustrated in FIG. 11. Further, the same reference numerals will be given to the same components as those of the third embodiment and repetitive description will be omitted.

As illustrated in FIGS. 11 and 12, in a motor 1d according to the modified example of the third embodiment, the exhaust hole 13 is opened to both the lower end of a third stator housing 41Cd in the axial direction and the outer circumferential surface in the radial direction.

In the example illustrated in FIG. 11, the opening portion of the exhaust hole 13 provided at the lower end of the third stator housing 41Cd in the axial direction is sealed by a sealing member 300, and the exhaust tube 15 of the suction exhaust device P such as a vacuum pump is connected to the opening portion of the exhaust hole 13 provided at the outer circumferential surface of the third stator housing 41Cd in the radial direction through the joint 14.

In the example illustrated in FIG. 12, the opening portion of the exhaust hole 13 provided at the outer circumferential surface of the third stator housing 41Cd in the radial direction is sealed by the sealing member 300, and the exhaust tube 15 of the suction exhaust device P such as a vacuum pump is connected to the opening portion of the exhaust hole 13 provided at the lower end of the third stator housing 41Cd in the axial direction through the joint 14.

Additionally, for example, a member such as a screw or a pin can be used as the sealing member 300 as long as the member can reliably seal any one of the opening portion provided at the lower end of the third stator housing 41Cd in the axial direction and the opening portion provided at the outer circumferential surface of the third stator housing 41Cd in the radial direction.

In the motor 1d according to the modified example of the third embodiment, the opening portion of the exhaust hole 13 is provided at both the lower end of the third stator housing 41Cd in the axial direction and the outer circumferential surface thereof in the radial direction, one of two opening portions of the exhaust hole 13 is sealed by the sealing member 300, and the other side thereof is connected to the suction exhaust device P, and thus there is no need to mention that the same effect as that of the third embodiment can be obtained. Further, since the opening portion of the exhaust hole 13 connected to the suction exhaust device P can be selected from the opening portion provided at the lower end of the third stator housing 41Cd in the axial direction and the opening portion provided at the outer circumferential surface of the third stator housing 41Cd in the radial direction, the motor 1d can be more versatile.

Fourth Embodiment

Figure 13:
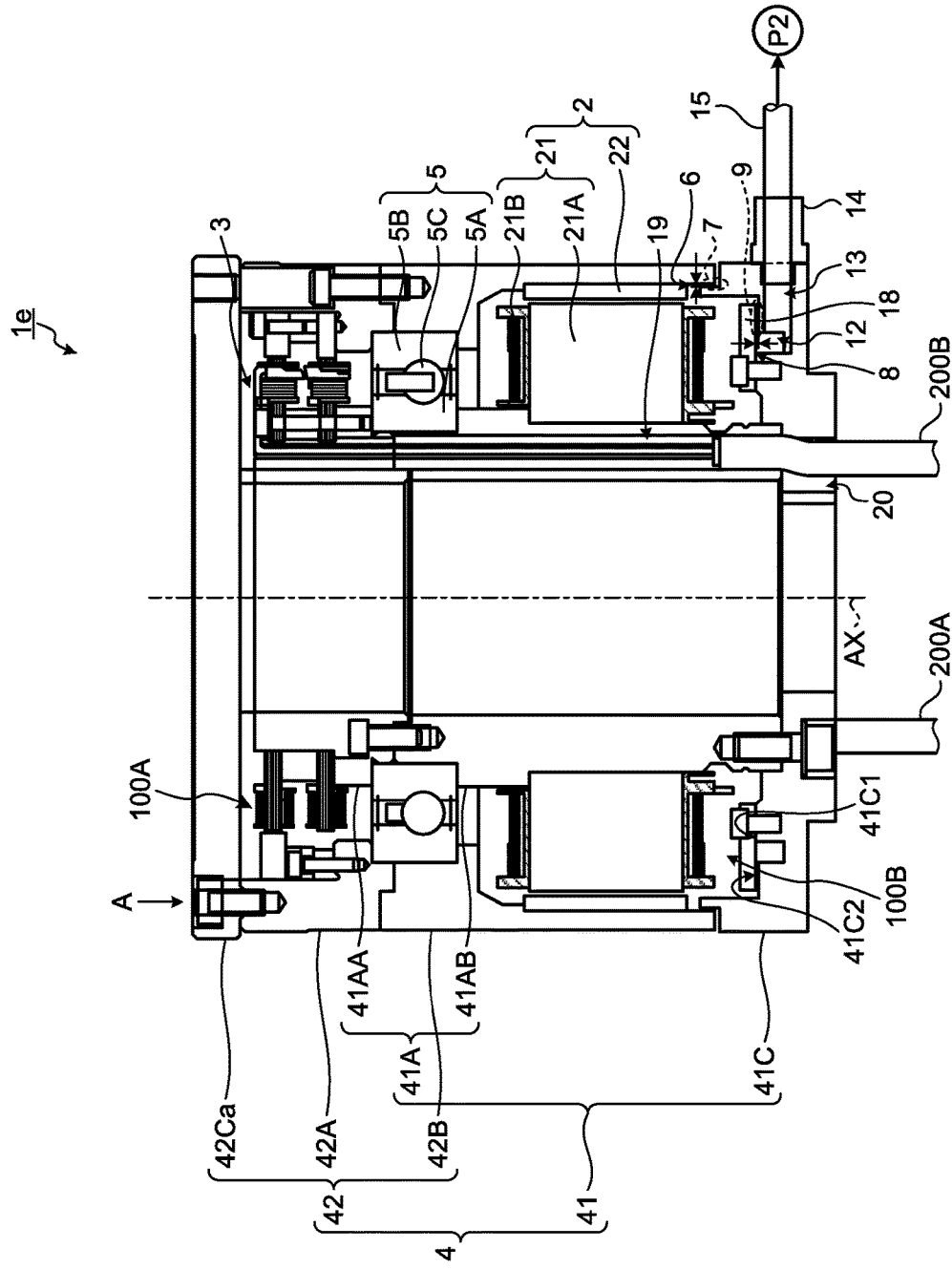
FIG. 13 is a cross-sectional view illustrating an example of a motor according to a fourth embodiment.

FIG. 13 is a cross-sectional view illustrating an example of a motor according to a fourth embodiment. Further, the same reference numerals will be given to the same components as those of the first embodiment and repetitive description will be omitted.

As illustrated in FIG. 13, in a motor 1e according to the fourth embodiment, a member 42Ca of the rotor housing 42 is a disk-shaped member and has a structure in which the circulation of air does not occur between the outside (the clean environment) and the first space 100A. That is, in the motor 1e of the fourth embodiment, there is no need to consider dust flowing from the first space 100A to a clean environment.

The motor 1 of the fourth embodiment includes the stator 21 which includes the coil 21B and the stator core 21A, the rotor 22 which is disposed at the outside of the stator 21 in the radial direction and rotates relative to the stator 21, the rotor housing 42 which rotates along with the rotor 22, the stator housing 41 which fixes the stator 21 thereto, and the bearing 5 which supports the rotor housing 42 to be rotatable relative to the stator housing 41. The stator housing 41 includes the first stator housing 41A and the third stator housing 41C. The third stator housing 41C forms the second space 100B along with the first stator housing 41A, the rotor housing 42, and the bearing 5 and overlaps the rotor housing 42 with the first gap 6 interposed therebetween in the entire circumferential direction. Further, the motor 1 includes the annular member 18 which overlaps the third stator housing 41C with a second gap 8 interposed therebetween in the entire circumferential direction inside the second space 100B, the exhaust hole 13 which sucks and discharges air inside the second space 100B through the second gap 8, and the exhaust groove 12 which is formed at the third stator housing 41C in the entire circumferential direction along the second gap 8 while being interposed between the second gap 8 and the exhaust hole 13.

In this structure, since the suction exhaust device P is connected to the exhaust hole 13 and the suction exhaust device P is operated, air of the second space 100B is uniformly sucked out from the exhaust hole 13, and air is uniformly sucked into the second space 100B from a seal portion 7. Accordingly, it is possible to reliably prevent dust generated in the second space 100B from flowing to the outside.

Further, the motor 1e can reduce the number of the management items for managing the accuracy of the second gap 8 forming an aperture portion 9. As a result, it is possible to improve the yield when manufacturing the motor 1e.

Further, the motor 1e can use a mechanical bearing such as a roller bearing or a sliding bearing which does not need an external power source such as power or compressed air.

Further, the motor 1e does not need a low dust grease having low dust generation as a lubricating grease for lubricating the movable portion and can use an optimal lubricating grease in response to a driving condition.

Further, in the above-described embodiments, an example in which the second stator housing 41B or 41Ba is fixed to the first stator housing 41A or 41Aa through the first annular member 10 or 10a has been described, but the first annular member 10 or 10a may be integrated with the first stator housing 41A or 41Aa. In this way, the number of components constituting the motor 1, 1a, 1b, 1c, 1d, or 1e can be reduced. Further, in this case, there is a merit that the number of the component accuracy management items is reduced. As a result, the yield is improved.

Further, also in the third stator housing 41C, 41Ca, 41Cb, 41Cc, or 41Cd, there is no need to mention that a configuration in which the third stator housing 41C, 41Ca, 41Cb, 41Cc, or 41Cd is fixed to the first stator housing 41A or 41Aa through the second annular member 18 similarly to the second stator housing 41B and 41Ba may be employed.

Further, the second annular member 18 may be integrated with the first stator housing 41A or 41Aa. In this way, the number of components constituting the motor 1, 1a, 1b, 1c, 1d, or 1e can be reduced. Further, in this case, there is a merit that the number of the component accuracy management items is reduced. As a result, the yield is improved.

Figure 14:
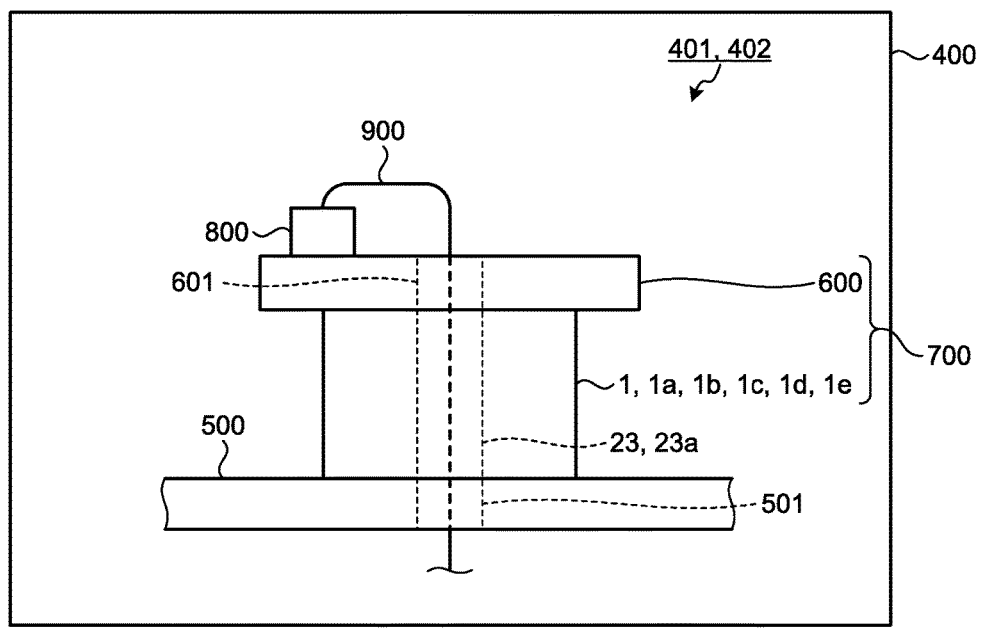
FIG. 14 is a diagram illustrating an application example of the motor according to the embodiment.

FIG. 14 is a diagram illustrating an application example of the motor according to the embodiment. The motor 1, 1a, 1b, 1c, 1d, or 1e according to the embodiment is used in a semiconductor manufacturing apparatus 401 or a flat display manufacturing apparatus 402, for example, under a clean environment 400. In the motor 1, 1a, 1b, 1c, 1d, or 1e, a part (the stator housing) of the housing (the casing) is supported by a base 500 through a fastening member. Additionally, the fastening member is a screw, a bolt, a pin, or the like. Accordingly, the motor 1, 1a, 1b, 1c, 1d, or 1e is fixed to the base 500.

The motor 1, 1a, 1b, 1c, 1d, or 1e constitutes an actuator 700 along with a driven object 600 driven by the motor 1, 1a, 1b, 1c, 1d, or 1e. The driven object 600 is supported by a part (the stator housing) of the housing (the casing) of the motor 1, 1a, 1b, 1c, 1d, or 1e through a fastening member. Additionally, the fastening member is a screw, a bolt, a pin, or the like. Accordingly, the driven object 600 is fixed to the motor 1, 1a, 1b, 1c, 1d, or 1e.

A manufactured object 800 is disposed on the upper portion of the driven object 600. A hollow hole 501 is provided at the base 500 and a hollow hole 601 is provided at the driven object 600.

The cable 900 which supplies power or signals to the manufactured object 800 is inserted through the hollow hole 501 of the base 500, the hollow hole 23 or 23a of the motor 1, 1a, 1b, 1c, 1d, or 1e, and the hollow hole 601 of the driven object 600 and is connected to the manufactured object 800.

As described above, since the motor 1, 1a, 1b, 1c, 1d, or 1e according to the embodiment can reliably prevent dust generated therein from flowing to the outside, the motor 1, 1a, 1b, 1c, 1d, or 1e according to the embodiment or the actuator 700 including the motor 1, 1a, 1b, 1c, 1d, or 1e according to the embodiment is suitably used in the semiconductor manufacturing apparatus 401 or the flat display manufacturing apparatus 402, for example, in the clean environment 400 illustrated in FIG. 14.

REFERENCE SIGNS LIST 1, 1a, 1b, 1c, 1d, 1e MOTOR
2 MOTOR PART
3 ROTATION DETECTOR
4 HOUSING
5 BEARING
5A INNER RACE
5B OUTER RACE
5C ROLLING BODY
6, 6A, 6B FIRST GAP
7 SEAL PORTION
7A FIRST SEAL PORTION
7B SECOND SEAL PORTION
8, 8A, 8B SECOND GAP
9 APERTURE PORTION
9A FIRST APERTURE PORTION
9B SECOND APERTURE PORTION
10, 10a FIRST ANNULAR MEMBER
11, 11a SPACER MEMBER
12 EXHAUST GROOVE
12A FIRST EXHAUST GROOVE
12B SECOND EXHAUST GROOVE
13 EXHAUST HOLE
13A FIRST EXHAUST HOLE
13B SECOND EXHAUST HOLE
14, 14A, 14B JOINT
15, 15A, 15B EXHAUST TUBE
16 GROOVE PORTION
17 O-RING
18 (SECOND) ANNULAR MEMBER
19 FIRST CABLE INSERTION HOLE
20 SECOND CABLE INSERTION HOLE
21 STATOR
21A STATOR CORE
21B COIL
22 ROTOR
23, 23a HOLLOW HOLE
41 STATOR HOUSING
41A, 41Aa FIRST STATOR HOUSING
41AA, 41AAa, 41AB, 41ABa MEMBER (FIRST STATOR HOUSING)
41B, 41Ba SECOND STATOR HOUSING
41C, 41Ca, 41Cb, 41Cc, 41Cd THIRD STATOR HOUSING
42 ROTOR HOUSING
42A, 42B, 42C MEMBER (ROTOR HOUSING)
100A FIRST SPACE
100B SECOND SPACE
200A, 200B CABLE
300 SEALING MEMBER
400 CLEAN ENVIRONMENT
401 SEMICONDUCTOR MANUFACTURING APPARATUS
402 FLAT DISPLAY MANUFACTURING APPARATUS
500 BASE
501 HOLLOW HOLE (BASE)
600 DRIVEN OBJECT
601 HOLLOW HOLE (DRIVEN OBJECT)
700 ACTUATOR
800 MANUFACTURED OBJECT
900 CABLE (MANUFACTURED OBJECT)
AX ROTATION AXIS
P, P1, P2 SUCTION EXHAUST DEVICE

The invention claimed is:

1. A motor comprising:
a stator which includes a coil and a stator core;
a rotor which is disposed at the outside of the stator in the radial direction and rotates relative to the stator;
a rotor housing which rotates along with the rotor;
a stator housing which fixes the stator thereto, includes a space formed between the stator housing and the rotor housing, and overlaps the rotor housing with a first gap interposed therebetween in the entire circumferential direction;
a bearing which supports the rotor housing to be rotatable relative to the stator housing;
an annular member which overlaps the stator housing with a second gap interposed therebetween in the entire circumferential direction inside the space;
an exhaust hole which sucks and discharges air of the space through the second gap; and
an exhaust groove which is interposed between the second gap and the exhaust hole and is provided at the stator housing in the entire circumferential direction along the second gap.

2. The motor according to claim 1,
wherein the stator housing includes
a first stator housing which includes at least two members sandwiching an inner race of the bearing in an axial direction having an axis corresponding to a rotation center of the rotor,
a second stator housing which is provided at one end side of the first stator housing in the axial direction and in which a first exhaust groove is provided between the first stator housing and the second stator housing, a first annular member is fixed therebetween, and the first gap is provided with respect to the first annular member, and
a third stator housing which is provided at the other end side of the first stator housing in the axial direction and in which a second exhaust groove is provided between the first stator housing and the third stator housing, a second annular member is fixed therebetween, and the first gap is provided with respect to the second annular member,
wherein the rotor housing includes at least two members that sandwich an outer race of the bearing in the axial direction,
wherein the first gap is provided between the second stator housing and the rotor housing and a first space is provided along with the first stator housing, the second stator housing, and the bearing, and
wherein the first gap is provided between the third stator housing and the rotor housing and a second space is provided along with the second stator housing, the third stator housing, and the bearing.

3. The motor according to claim 2,
wherein a surface facing the second stator housing in the first annular member is provided with a step forming the second gap with respect to the second stator housing.

4. The motor according to claim 2,
wherein a surface facing the first annular member in the second stator housing is provided with a step forming the second gap with respect to the second stator housing.

5. The motor according to claim 2, further comprising:
a spacer member that is interposed between the first annular member and the second stator housing to form the second gap between the first annular member and the second stator housing.

6. The motor according to claim 2,
wherein a surface facing the third stator housing in the second annular member is provided with a step forming the second gap with respect to the third stator housing.

7. The motor according to claim 2,
wherein a surface facing the second annular member in the third stator housing is provided with a step forming the second gap with respect to the second annular member.

8. The motor according to claim 2, further comprising:
a spacer member that is interposed between the second annular member and the third stator housing to form the second gap between the second annular member and the third stator housing.

9. The motor according to claim 2,
wherein a groove portion is provided at a fitting surface formed by overlapping the second stator housing and the first stator housing in the radial direction and an O-ring is provided at the groove portion.

10. The motor according to claim 2,
wherein a first exhaust hole is provided at the second stator housing and a second exhaust hole is provided at the third stator housing.

11. The motor according to claim 2,
wherein the first exhaust hole is provided so that the second stator housing, the first stator housing, and the third stator housing communicate with each other, and
wherein the second exhaust hole is provided at the third stator housing.

12. The motor according to claim 10,
wherein the first exhaust hole is formed so that an opening portion is provided at the other end of the second stator housing in the axial direction, and
wherein the second exhaust hole is formed so that an opening portion is provided at a circumferential surface of the third stator housing.

13. The motor according to claim 2,
wherein the exhaust hole is formed so that the second stator housing, the first stator housing, and the third stator housing communicate with one another and the first exhaust groove and the second exhaust groove are connected to each other.

14. The motor according to claim 13,
wherein the exhaust hole is formed so that an opening portion is provided at an outer circumferential surface of the third stator housing in the radial direction.

15. The motor according to claim 13,
wherein the exhaust hole is formed so that an opening portion is provided at the other end of the third stator housing in the axial direction.

16. The motor according to claim 13,
wherein the exhaust hole is formed so that an opening portion is provided at an outer circumferential surface of the third stator housing in the radial direction and the other end of the third stator housing in the axial direction, and any one of opening portions is sealed.

17. The motor according to claim 2,
wherein the second stator housing is fixed to the first stator housing through the first annular member.

18. The motor according to claim 2,
wherein the first annular member is integrated with the first stator housing.

19. The motor according to claim 2,
wherein the third stator housing is fixed to the first stator housing through the second annular member.

20. The motor according to claim 2,
wherein the second annular member is integrated with the first stator housing.

21. The motor according to claim 1,
wherein the first stator housing is provided with a first cable insertion hole formed in the axial direction so that a motor driving or detecting cable is inserted therethrough,
wherein the third stator housing is provided with a second cable insertion hole formed in the axial direction so as to communicate with the first cable insertion hole and to insert a cable therethrough, and
wherein a radial center position of the first cable insertion hole and a radial center position of the second cable insertion hole are different from each other so that an opening area formed by overlapping the first cable insertion hole and the second cable insertion hole in the axial direction is substantially the same as a cross-sectional area of the cable.

22. The motor according to claim 1,
wherein the bearing is a roller bearing or a sliding bearing.

23. An actuator comprising:
the motor according to claim 1; and
a driven object which is driven by the motor.

24. A semiconductor manufacturing apparatus comprising:
the motor according to claim 1.

25. A flat display manufacturing apparatus comprising:
the motor according to claim 1.

* * * * *